(12) United States Patent
Lee et al.

(10) Patent No.: US 8,296,467 B2
(45) Date of Patent: Oct. 23, 2012

(54) SINGLE-CHIP FLASH DEVICE WITH BOOT CODE TRANSFER CAPABILITY

(75) Inventors: Charles C. Lee, Cupertino, CA (US);
Frank Yu, Palo Alto, CA (US);
Abraham C. Ma, Fremont, CA (US);
Shimon Chen, Los Gatos, CA (US)

(73) Assignee: Super Talent Electronics Inc., San Jose, CA (US)

( * ) Notice: Subject to any disclaimer, the term of this patent is extended or adjusted under 35 U.S.C. 154(b) by 57 days.

(21) Appl. No.: 12/947,211

(22) Filed: Nov. 16, 2010

(65) Prior Publication Data

US 2011/0066837 A1   Mar. 17, 2011

Related U.S. Application Data

(63) Continuation-in-part of application No. 11/611,811, filed on Dec. 15, 2006, now abandoned, which is a continuation-in-part of application No. 09/478,720, filed on Jan. 6, 2000, now Pat. No. 7,257,714, and a continuation-in-part of application No. 10/957,089, filed on Oct. 1, 2004, now abandoned, application No. 12/947,211, which is a continuation of application No. 12/426,378, filed on Apr. 20, 2009, now Pat. No. 7,865,630, and a continuation of application No. 12/128,916, filed on May 29, 2008, now Pat. No. 7,552,251, which is a continuation of application No. 11/309,594, filed on Aug. 28, 2006, now Pat. No. 7,383,362, which is a continuation-in-part of application No. 10/707,277, filed on Dec. 2, 2003, now Pat. No. 7,103,684, application No. 12/947,211, which is a continuation of application No. 12/651,321, filed on Dec. 31, 2009, now abandoned, which is a continuation of application No. 11/679,716, filed on Feb. 27, 2007, now abandoned, application No. 12/947,211, which is a continuation-in-part of application No. 11/466,759, filed on Aug. 23, 2006, (Continued)

(51) Int. Cl.
*G06F 3/00* (2006.01)
*G06F 12/00* (2006.01)

(52) U.S. Cl. .......................................... 710/5; 711/103
(58) Field of Classification Search ................ 710/16
See application file for complete search history.

(56) References Cited

U.S. PATENT DOCUMENTS 5,664,194 A * 9/1997 Paulsen ........................ 717/178

(Continued)

*Primary Examiner* — Henry Tsai
*Assistant Examiner* — Titus Wong
(74) *Attorney, Agent, or Firm* — Stuart T. Auvinen; gPatent LLC

(57) ABSTRACT

A Multi-Media Card (MMC) Single-Chip Flash Device (SCFD) contains a MMC flash microcontroller and flash mass storage blocks containing flash memory arrays that are block-addressable rather than randomly-addressable. An initial boot loader is read from the first page of flash by a state machine and written to a small RAM. A central processing unit (CPU) in the microcontroller reads instructions from the small RAM, executing the initial boot loader, which reads more pages from flash. These pages are buffered by the small RAM and written to a larger DRAM. Once an extended boot sequence is written to DRAM, the CPU toggles a RAM_BASE bit to cause instruction fetching from DRAM. Then the extended boot sequence is executed from DRAM, copying an OS image from flash to DRAM. Boot code and control code are selectively overwritten during a code updating operation to eliminate stocking issues.

16 Claims, 26 Drawing Sheets

Related U.S. Application Data now Pat. No. 7,702,831, which is a continuation-in-part of application No. 10/789,333, filed on Feb. 26, 2004, now Pat. No. 7,318,117, application No. 12/947,211, which is a continuation-in-part of application No. 12/175,753, filed on Jul. 18, 2008, now abandoned, and a continuation-in-part of application No. 10/888,282, filed on Jul. 8, 2004, now Pat. No. 7,941,916, and a continuation-in-part of application No. 10/605,140, filed on Sep. 10, 2003, now Pat. No. 6,874,044, and a continuation-in-part of application No. 12/186,471, filed on Aug. 5, 2008, and a continuation-in-part of application No. 12/252,155, filed on Oct. 15, 2008, now Pat. No. 8,037,234, and a continuation-in-part of application No. 12/475,457, filed on May 29, 2009, and a continuation-in-part of application No. 12/576,216, filed on Oct. 8, 2009.

(56) References Cited

U.S. PATENT DOCUMENTS

| | | | |
|---|---|---|---|
| 6,266,736 B1 * | 7/2001 | Atkinson et al. | 711/103 |
| 6,301,656 B1 * | 10/2001 | Streett et al. | 713/2 |
| 6,816,750 B1 * | 11/2004 | Klaas | 700/121 |

* cited by examiner

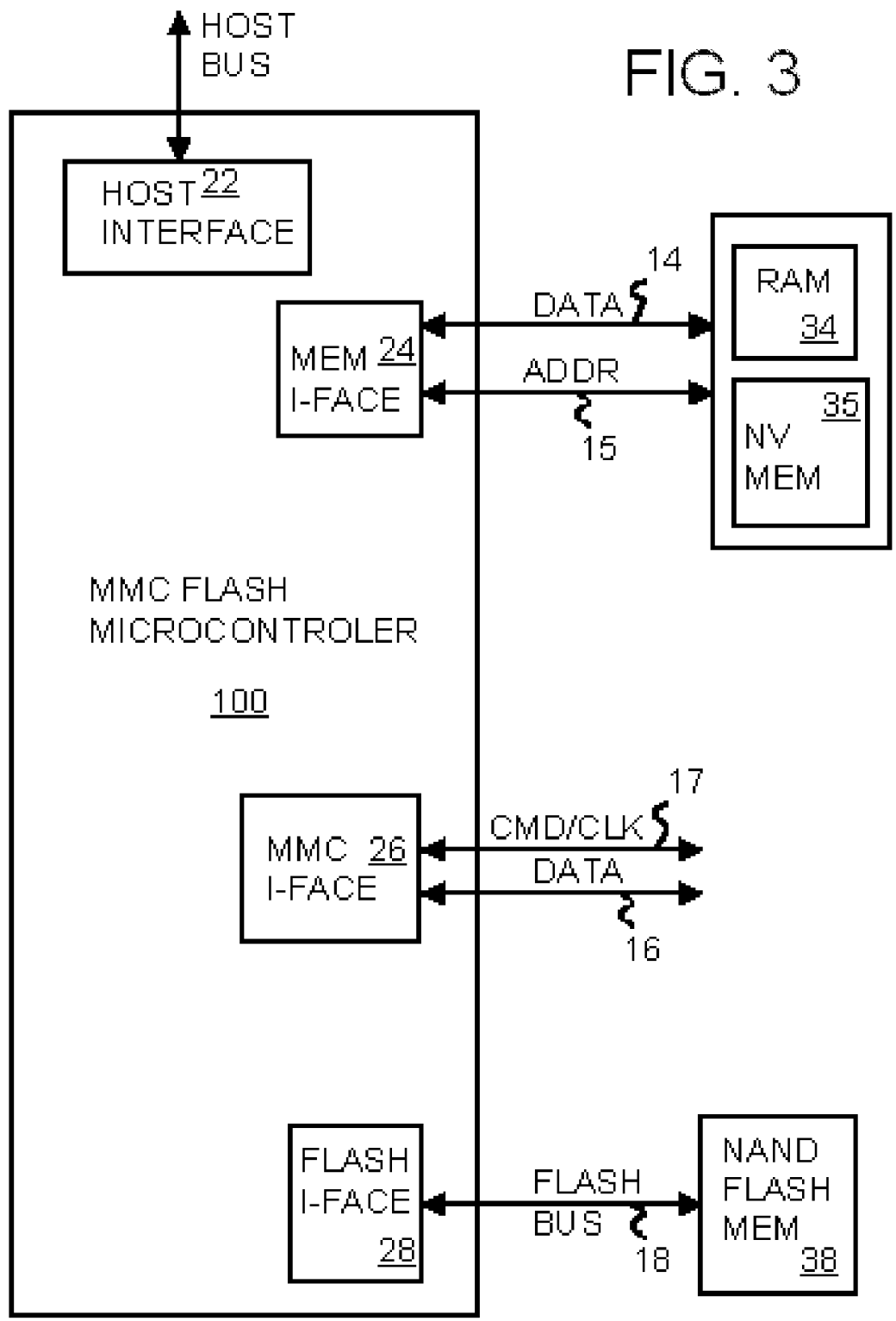

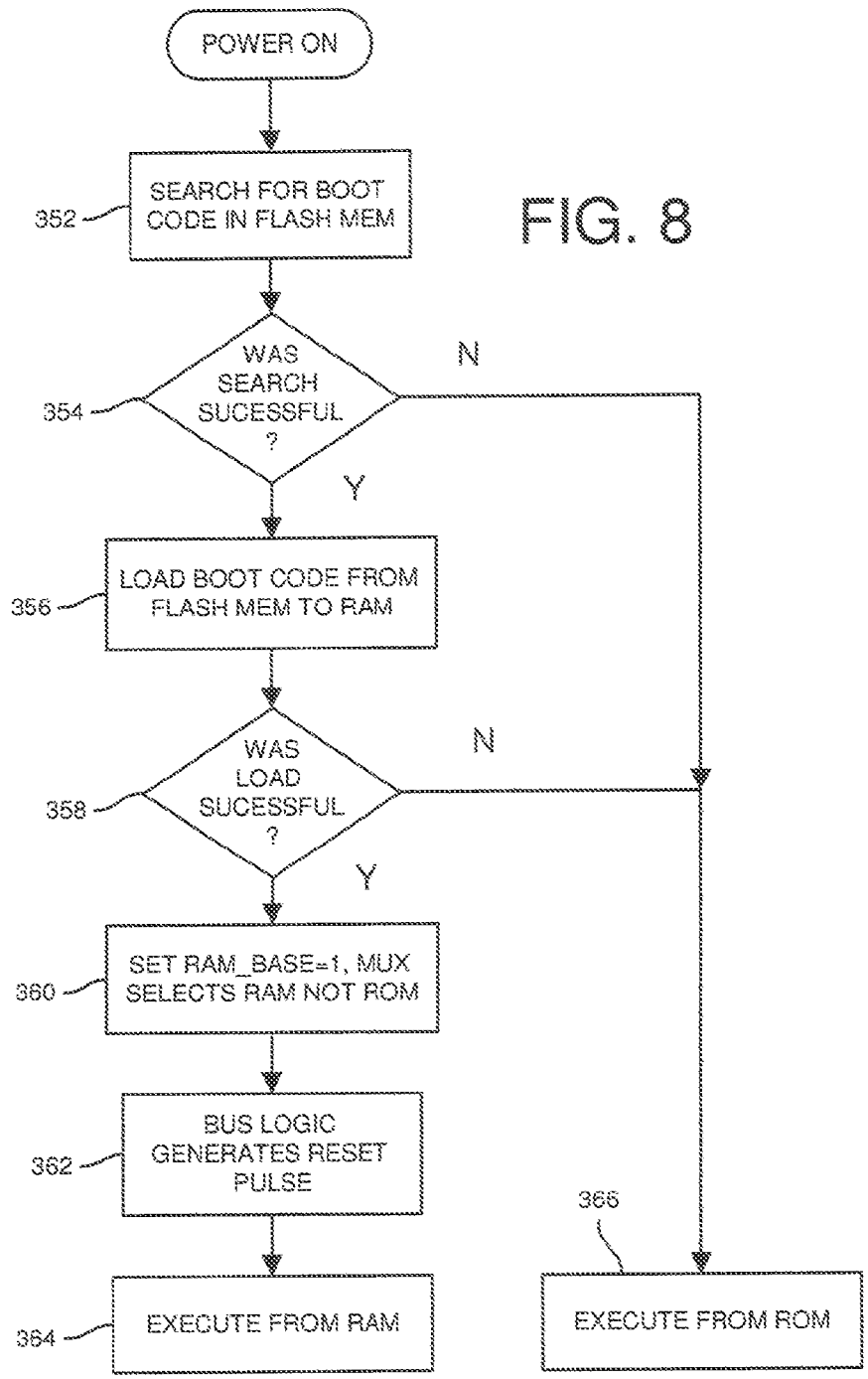

SINGLE-CHIP FLASH DEVICE WITH BOOT CODE TRANSFER CAPABILITY

RELATED APPLICATION

This application is a continuation-in-part (CIP) of U.S. patent application for "Electronic Data Flash Card with Boot/Control Code Transferred from Read-Only-Memory", (as amended), U.S. Ser. No. 11/611,811 filed Dec. 15, 2006, now abandoned which is a CIP of "Electronic Data Storage Medium with Fingerprint Verification Capability", U.S. application Ser. No. 09/478,720, filed Jan. 6, 2000, now U.S. Pat. No. 7,257,714 and a continuation-in-part of U.S. patent application for "FLASH CARD SYSTEM", U.S. application Ser. No. 10/957,089, filed Oct. 1, 2004 now abandoned.

This application is a continuation of the application for "Single-Chip Multi-Media Card/Secure Digital (MMC/SD) Controller Reading Power-On Boot Code from Integrated Flash Memory for User Storage", U.S. Ser. No. 12/426,378, filed on Apr. 20, 2009 now U.S. Pat. No. 7,865,630, and U.S. Ser. No. 12/128,916, filed on May 29, 2008, now U.S. Pat. No. 7,552,251, which is a continuation of U.S. Ser. No. 11/309,594 filed Aug. 28, 2006, now U.S. Pat. No. 7,383,362, which is a Continuation-In-Part (CIP) of "Single-Chip USB Controller Reading Power-On Boot Code from Integrated Flash Memory for User Storage", U.S. Ser. No. 10/707,277, filed Dec. 2, 2003, now U.S. Pat. No. 7,103,684.

This application is a continuation of "Mixed-Mode ROM/RAM Booting Using an Integrated Flash Controller with NAND-Flash, RAM, and SD Interfaces", U.S. Ser. No. 12/651,321, filed Dec. 31, 2009 now abandoned, which is a continuation of U.S. Ser. No. 11/679,716, filed Feb. 27, 2007 now abandoned.

This application is also a CIP of "Flash Memory Controller for Electronic Data Flash Card", U.S. Ser. No. 11/466,759, filed Aug. 23, 2006 now U.S. Pat. No. 7,702,831, which is a CIP of "System and Method for Controlling Flash Memory", U.S. Ser. No. 10/789,333, filed Feb. 26, 2004, now U.S. Pat. No. 7,318,117.

This application is a continuation-in-part of the co-pending applications for "Direct package Mold Process for Single Chip SD Flash Cards", U.S. Ser. No. 12/175,753 filed Jul. 18, 2008 now abandoned, and "Manufacturing Method for Memory Card", U.S. Ser. No. 10/888,282, filed Jul. 8, 2004 now U.S. Pat. No. 7,941,916.

This application is a continuation-in-part of "Flash drive/reader with serial-port controller and flash-memory controller mastering a second RAM-buffer bus parallel to a CPU bus", U.S. Ser. No. 10/605,140, filed Sep. 10, 2003, now U.S. Pat. No. 6,874,044. This application is a continuation-in-part of "Multi-Level Controller with Smart Storage Transfer Manager for Interleaving Multiple Single-Chip Flash Memory Devices, U.S. Ser. No. 12/186,471, filed Aug. 5, 2008.

This application is a continuation-in-part of "Command Queuing Smart Storage Transfer Manager for Striping Data to Raw-NAND Flash Modules", U.S. Ser. No. 12/252,155, filed Oct. 15, 2008 now U.S. Pat. No. 8,037,234.

This application is a continuation-in-part of "Multi-Level Striping and Truncation Channel-Equalization for Flash-Memory System", U.S. Ser. No. 12/475,457, filed May 29, 2009.

This application is a continuation-in-part of "Flash-Memory System with Enhanced Smart-Storage Switch and Packed Meta-Data Cache for Mitigating Write Amplification by Delaying and Merging Writes until a Host Read", U.S. Ser. No. 12/576,216, filed Oct. 8, 2009.

FIELD OF THE INVENTION

This invention relates to flash memory storage, and more particularly to a flash-memory controller integrated with a parallel flash memory.

BACKGROUND OF THE INVENTION

Flash memory has gained wide acceptance for its non-volatile storage, which is ideal for portable devices that may lose power, since the data is not lost when stored in the flash memory. Flash memories are constructed from electrically-erasable programmable read-only memory (EEPROM) cells.

Rather than use a randomly-addressable scheme such as is common with dynamic-random-access memory (DRAM), many flash memories use a block-based addressing where a command and an address are sent over the data bus and then a block of data is read or written. Since the data bus is also used to send commands and addresses, fewer pins are needed on the flash-memory chip, reducing cost. Thus flash memory is often used as a mass-storage device rather than a randomly-addressable device.

Universal-Serial-Bus (USB) has become a popular standard interface for connecting peripherals to a host such as a personal computer (PC). USB-based flash-memory storage devices or "drives" have been developed to transport data from one host to another, replacing floppy disks. While large external flash drives may be used, smaller USB flash drives known as key-chain or key drives have been a rapidly growing market.

A USB flash-memory device can be constructed from a microcontroller, a flash-memory controller or interface, and one or more flash-memory chips. A serial interface on the microcontroller connects to the USB bus to the host, and data from the serial interface is transferred through the microcontroller to the flash controller and then written to the flash-memory chips.

The microcontroller usually contains an internal ROM with a control program that is read by the internal central processing unit (CPU) of the microcontroller when the microcontroller is booted or powered up. Once initialized with the control program, the CPU can control data transfers between the serial interface and the flash controller.

Sometimes the user may desire to connect to more than one USB flash-memory device. The user can install a USB hub, and then plug the USB flash-memory devices into the USB hub's downstream ports. USB hubs allow one USB port on a host to fan out to multiple end USB devices or endpoints. A basic USB hub has a repeater that repeats data from the host to all down-stream devices, while more intelligent hubs based on the USB 2.0 standard can buffer data to different downstream ports.

The parent application, now U.S. Pat. No. 7,103,684, disclosed a USB flash drive that did not need a read-only memory (ROM) for booting. The microcontroller in the USB flash drive was able to read boot code from the block-addressable flash memory and transfer the boot code to the microcontroller's RAM for execution.

Another popular bus standard is Multi-Media Card (MMC). MMC flash devices are common today. It is desired to extend the ROM-less flash-memory-drive microcontroller of the parent application to MMC, Memory Stick (MS) and other similar portable buses.

A problem with conventional flash memory systems is that the boot code and/or the control code can have bugs, which may not be discovered until the flash memory system is already in the field. Also, the boot code and/or the control code may have to be updated due to bugs or due to improvements to the codes.

The conventional solution is to replace the flash memory controller chip as this chip contains the ROM, in which the boot code and the control code are stored. A problem with this solution is that it can cause significant inventory issues for a flash card manufacturer. For instance, an entire stock of flash memory controllers may have to be thrown out for one fix or for an update to the boot code or to the control code. Hence, a new stock of flash memory controllers would have to be ordered. This can be an on-going problem if subsequent updates are required.

What is desired is an improved flash memory system that is be adaptable, simple, cost effective, and capable of being easily adapted to existing technology.

BRIEF DESCRIPTION OF THE DRAWINGS

FIG. 3 shows a microcontroller with multiple memory interfaces.

FIG. 8 is a flowchart of booting from ROM and RAM by toggling a RAM_BASE bit and resetting.

DETAILED DESCRIPTION

The present invention relates to an improvement in flash memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1A:
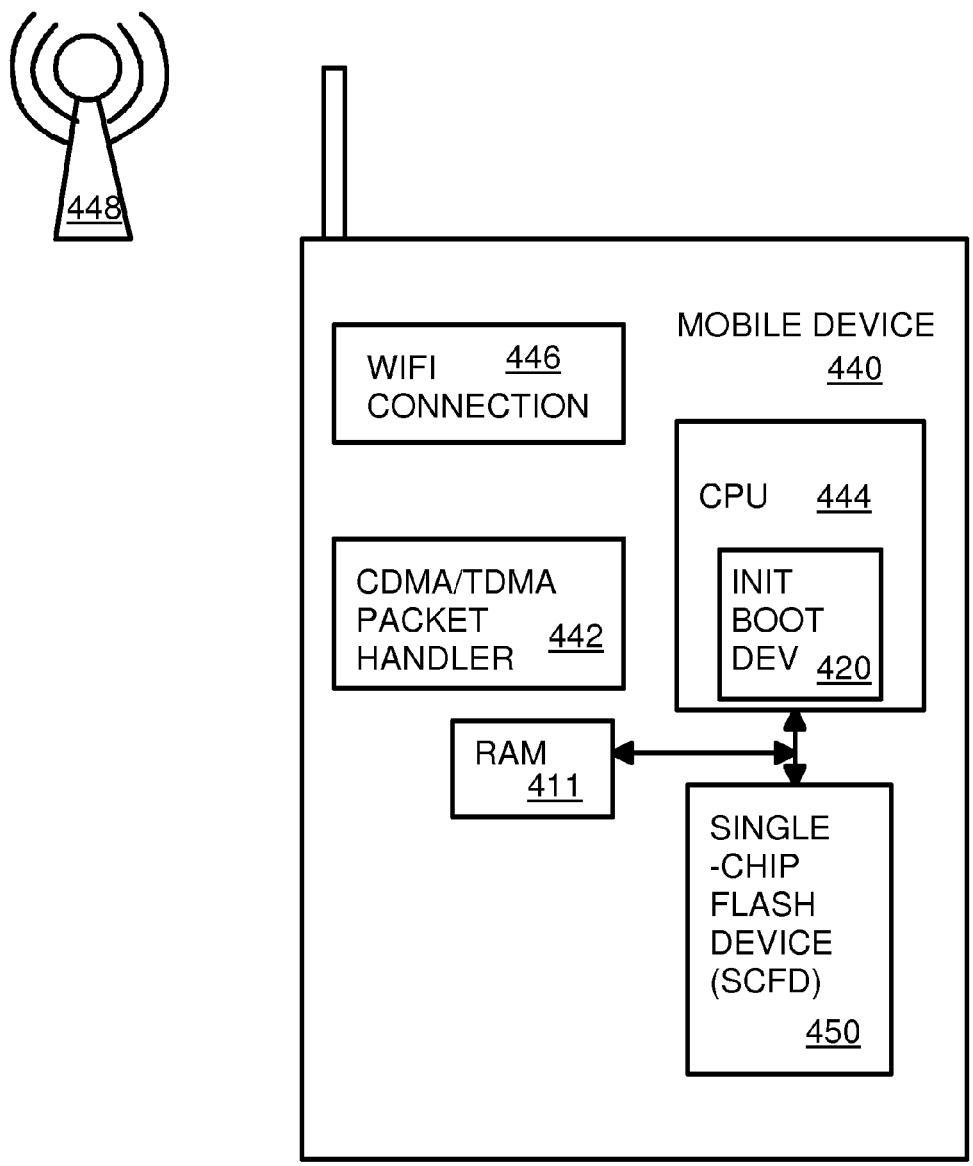
FIG. 1A shows a mobile-device application for a single-chip flash device.

FIG. 1A shows a mobile-device application for a single-chip flash device. Mobile device 440 may be a mobile phone, smart phone, mobile terminal, music player, or combo device. WiFi connection 446 contains a Radio-Frequency (RF) transceiver that wirelessly connects to antenna 448 and to a network such as the Internet. CDMA/TDMA packet handler 442 sends and receives packets in the format used by the RF network of antenna 448 and performs other overhead functions. Central Processing Unit (CPU) 444 executes programs to receive user input and display data to the user of mobile device 440. Data and programs are stored in single-chip flash device 450 and are accessed by CPU 444.

A optional RAM 411 is added for temporal data storage or buffering from single-chip flash device 450 for the purpose of faster CPU execution. In the mean time, small boot device 420 inside CPU can help mobile device 440 for initial system bootstrapping, fetching boot code data from single-chip flash device 450, and some initial system diagnosis. Small boot device 420 can be as simple as just one fetch from external single-chip flash device 450 at a fixed address and executing the boot code from RAM 411 when a reset signal has been received by CPU 444

Figure 1B:
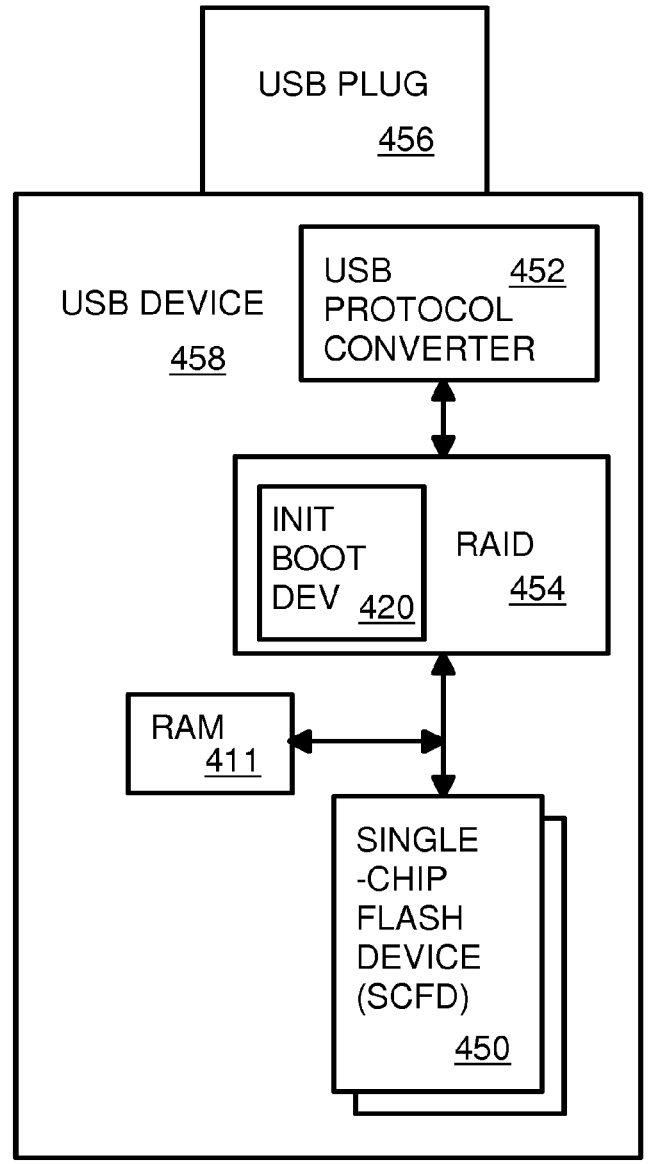
FIG. 1B shows a Universal-Serial-Bus (USB) device application for a single-chip flash device.

FIG. 1B shows a Universal-Serial-Bus (USB) device application for a single-chip flash device. USB device 458 may be a music player, combo device, or some other device with USB plug 456. USB protocol converter 452 sends and receives USB packets through USB plug 456 and performs USB conversions other overhead functions. Redundant Array of Individual Disks (RAID) controller 454 allows for data to be replicated across several single-chip flash devices 450 for redundant data protection. Data and programs are stored in single-chip flash devices 450 and are accessed by RAID controller 454.

FIG. 1B is shown using a USB storage device as a typical example. For better performance, RAID 454 can be a RAID0 component instead of normal redundant data protection. In such a case, for example, odd addresses and even addresses are dispatched to different single-chip flash device 450 and allow for a faster response, but the RAID0 approach does not limit to only odd and even addressing; multi-way may be used to fully utilize the available bandwidth single-chip flash device 450 provides. RAM 411 and small boot device 420 are applied in FIG. 1B as well to help the performance of USB device 458.

Figure 1C:
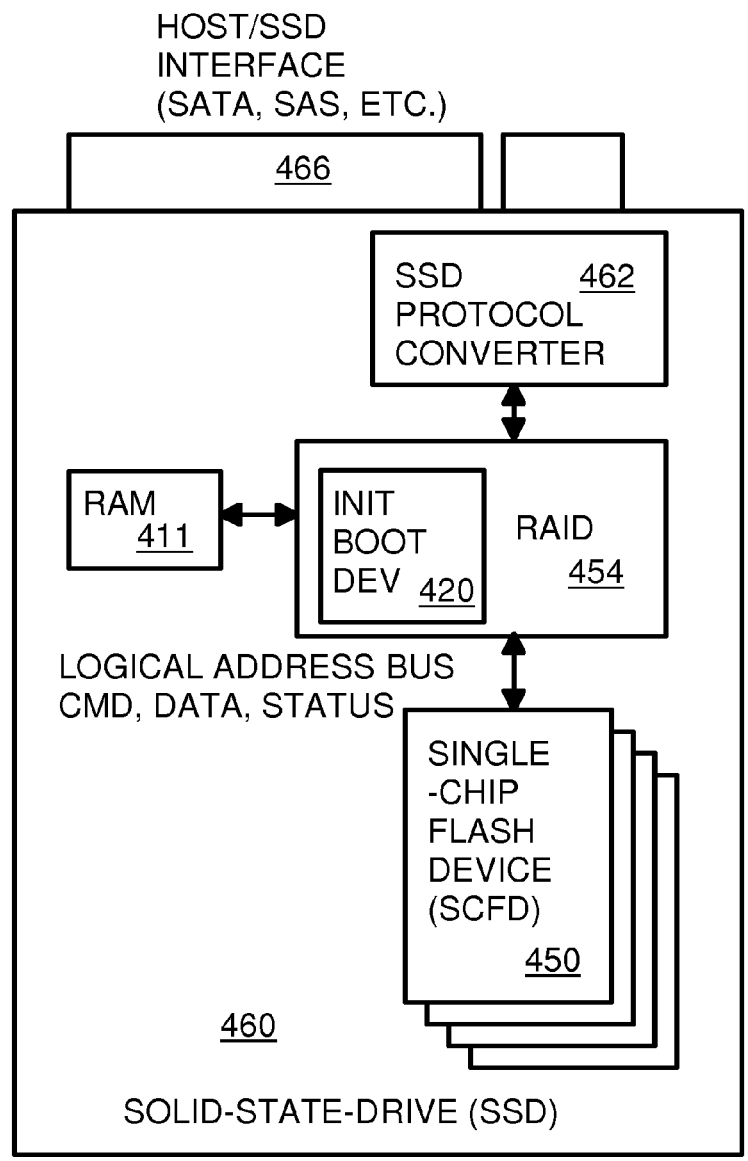
FIG. 1C shows a solid-state-drive (SSD) application for a single-chip flash device.

FIG. 1C shows a solid-state-drive (SSD) application for a single-chip flash device. SSD 460 has host connector 466 which fits into a connector to a host. SSD protocol converter 462 sends and receives packets through SSD connector 466 and performs protocol conversions other overhead functions. Protocols used for the host interface may include Serial AT-Attachment (SATA), Serial Attached Storage (SAS), etc.

In FIG. 1C, RAID 454 can be either RAID0 for faster device access as explained above, or it can be a normal RAID 1, 2, 3, 5 approach for data storage protection purposes. Data inside of multiple single-chip flash devices 450 can be either spanned, striped, or mirrored depending on which algorithm RAID 454 is adopting, which has been depicted in "Multi-Level Controller with Smart Storage Transfer Manager for Interleaving Multiple Single-Chip Flash Memory Devices, U.S. Ser. No. 12/186,471. In such a case, RAID 454 can be multi-level to fully utilize the bandwidth each single-chip flash device 450 provides. Optional RAM 411 and small boot device 420 are applied in FIG. 1C as well to allow more efficient operation of SSD 460.

Redundant Array of Individual Disks (RAID) controller 454 allows for data to be replicated across several single-chip flash devices 450 for redundant data protection. Data and programs are stored in single-chip flash devices 450 and are accessed by RAID controller 454. A logical address bus connects to single-chip flash devices 450.

Figure 1D:
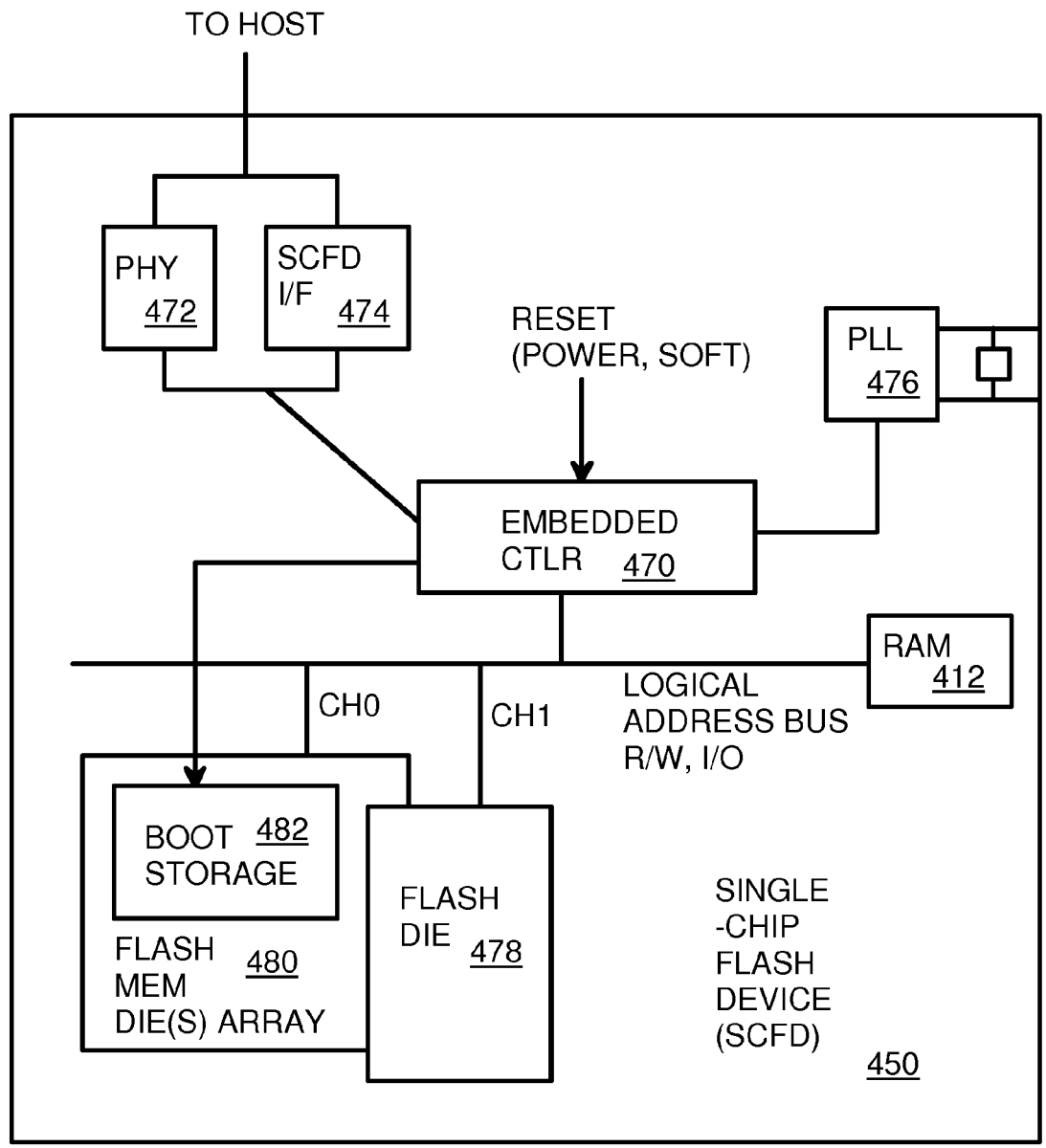
FIG. 1D is a block diagram of a single-chip flash device.

FIG. 1D is a block diagram of a single-chip flash device. Single-chip flash device 450 has physical interface 472 that performs physical signaling on a bus to a host. SCFD interface 474 performs other device-specific interfacing. SCFD interface 474 can be an embedded Multi-Media Card (eMMC) interface that supports reliable writes, boot, sleep modes, dual-data rate transfers, multiple partitions, and security enhancements. The boot loader may be loaded from boot storage 482 of the flash memory device to optional RAM 412 for improving the data transfer rate when a reset signal has been received by embedded controller 470.

Embedded controller 470 is clocked by Phase-Locked Loop (PLL) 476 and is reset by an external hard or soft reset. Host data from physical interface 472 is transferred by embedded controller 470 over a logical address bus to one or more flash die 478 which forms flash memory die array 480. Multiple channels CH0, CH1 may be used to access the flash memory. Boot code may be stored in boot storage 482 as part of flash memory die array 480.

Figure 1E:
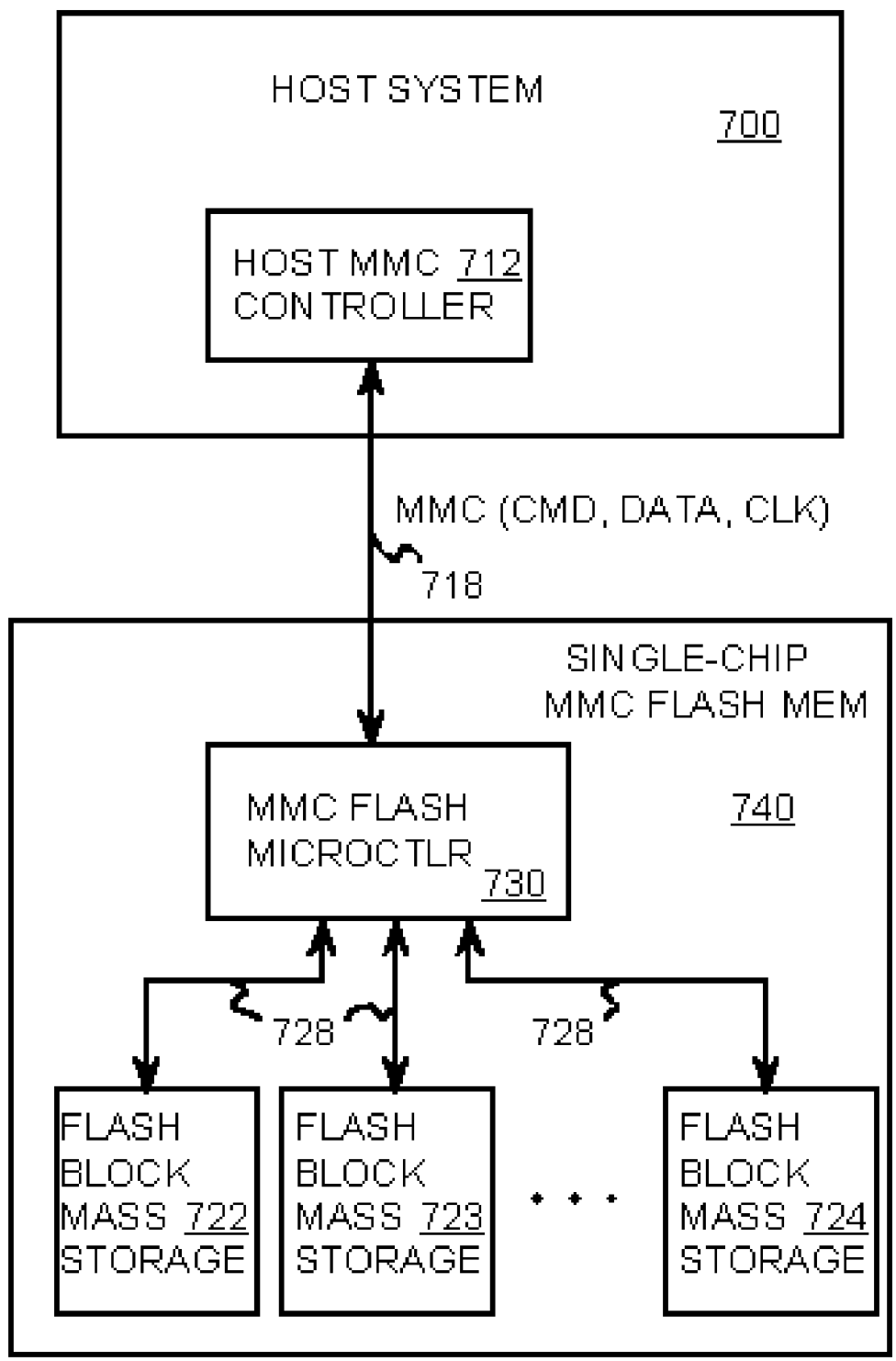
FIG. 1E is a block diagram of a flash microcontroller integrated with MMC flash mass storage blocks.

FIG. 1E is a block diagram of a flash microcontroller integrated with MMC flash mass storage blocks. MMC host controller 712 for host 710 sends transactions over MMC bus 718 to MMC single-chip flash device 740. MMC flash microcontroller 730 on MMC single-chip flash device 740 receives and responds to transactions from host 710 over MMC bus 718. MMC flash microcontroller 730 has an interface that acts as the final MMC endpoint for transactions on MMC bus 718 from host 710. Transactions can include commands and data streams. The commands activate routines that execute on MMC flash microcontroller 730, including routines to access blocks of flash memory.

MMC flash microcontroller 730 also contains a flash-memory controller that sends data on internal flash buses 728 to flash mass storage blocks 722, 723, 724. Flash mass storage blocks 722, 723, 724 respond to internal requests from MMC flash microcontroller 730 by transferring data over internal flash buses 728.

Since internal flash buses 728 are internal to MMC single-chip flash device 740, external pins are not required for the interface to flash memory. A wider internal bus of 32, 64, or 128 bits can be used for internal flash buses 728, improving data bandwidth. However, flash mass storage blocks 722, 723, 724 are not randomly accessible. Instead, a command and an address are transferred as data over internal flash buses 728 to indicate a block of data to transfer from flash mass storage blocks 722, 723, 724. Thus flash mass storage blocks 722, 723, 724 are block-addressable mass storage rather than random-access memory (RAM).

Flash mass storage blocks 722, 723, 724 may be aggregated together by MMC flash microcontroller 730, which maps and directs data transactions to selected flash storage blocks 722, 723, 724. Since MMC flash microcontroller 730 performs memory management, flash storage blocks 722, 723, 724 appear as a single, contiguous memory to host 710.

Figure 1F:
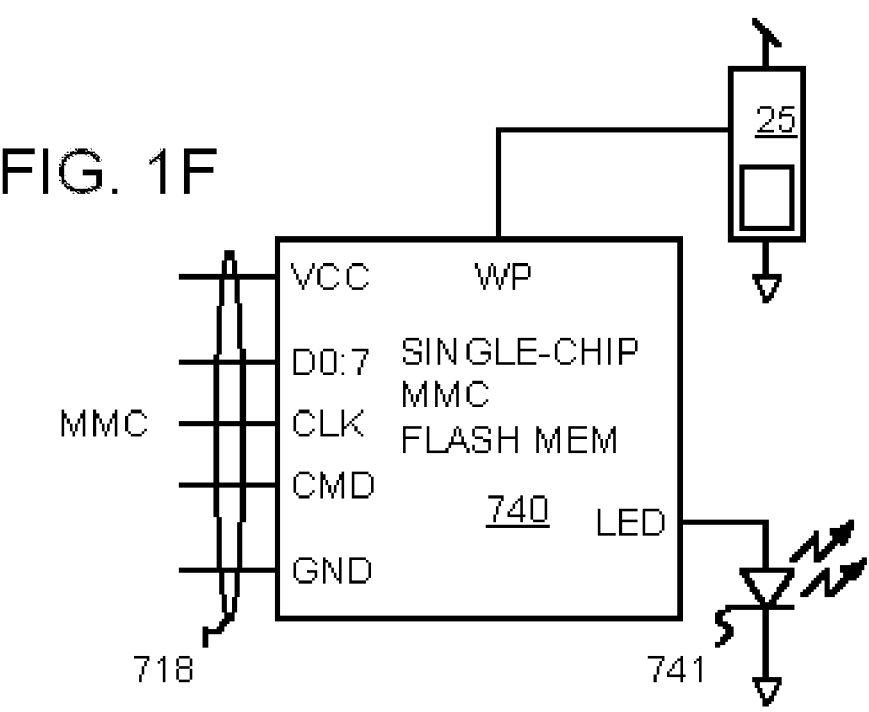
FIG. 1F shows external pin connections to a MMC single-chip flash device.

FIG. 1F shows external pin connections to a MMC single-chip flash device. MMC single-chip flash device 740 connects to the host through MMC bus 718, which has power (Vcc), ground, a clock that is input to MMC single-chip flash device 740, and a parallel data bus. The data bus may be 4 or 5 bits for older versions of the MMC standards, or 8 bits for more recent MMC versions. A command pin CMD may also be present for the standard or may be multiplexed with a MMC data pin. The data pins are full-swing non-differential and carry parallel data synchronized to the clock.

A write-protect (WP) pin connects externally to switch 25. Switch 25 can be switched by the user to indicate write-protect or write-enable modes of the flash memory inside MMC single-chip flash device 740.

A status output pin for a light-emitting diode (LED) can be included on some embodiments. The status-LED pin can drive LED 741 to indicate a status of MMC single-chip flash device 740. For example, LED 741 can be made to blink when the internal flash memory is being written so that the user does not unplug the device before writing is completed.

Relatively few pins are needed for MMC single-chip flash device 740. Since the current MMC bus 718 has 10 or fewer signal pins (8 data pins plus 1 command pin and 1 clock pin), depending on the MMC version, excluding power and ground, as few as 10 signal pins are needed when no LED signaling is required. All commands, addresses, status, and data are carried as parallel clocked-data over the data lines in MMC bus 718. Additional power and ground pins, or pins for other functions could be added, but packages with 10 signal pins are relatively inexpensive and require little board space. The total pin count on the package may be 20 or fewer pins Power consumption is also reduced, since fewer higher-capacitance external signals are driven by MMC single-chip flash device 740. However, a pin count over 20 is possible for wider data bus, such as a 32 bit wide data bus for future applications.

Figure 1G:
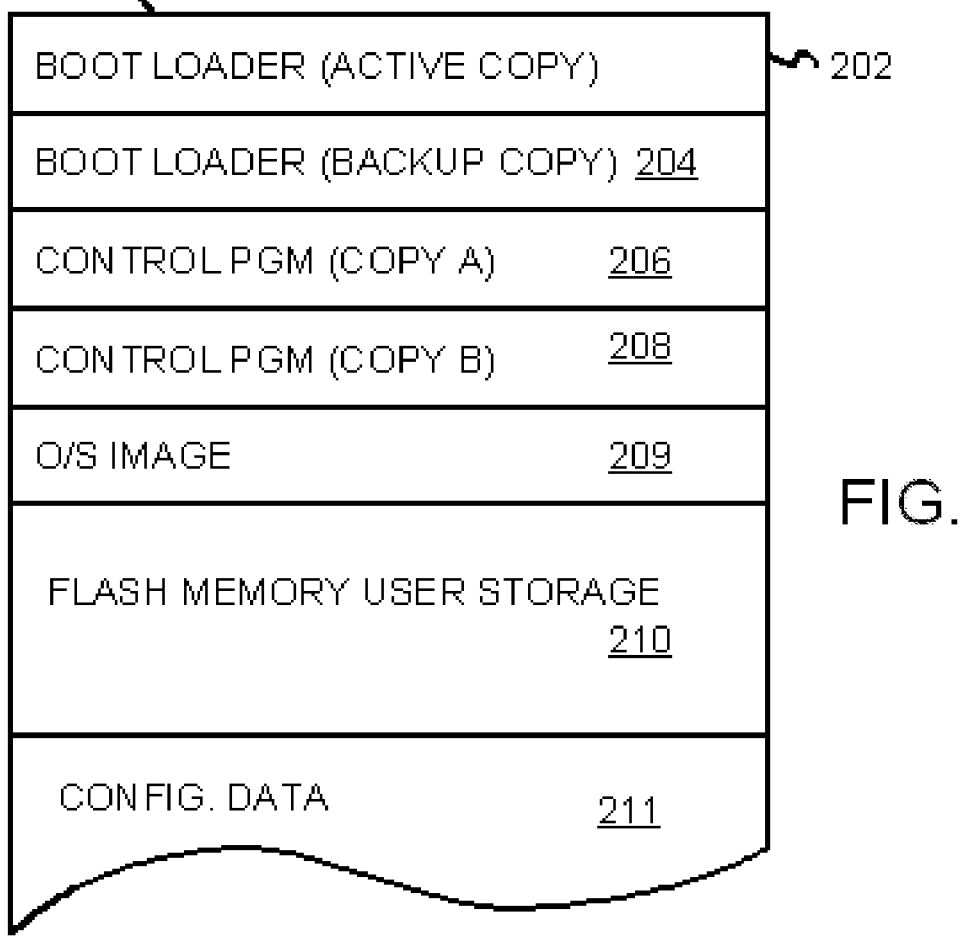
FIG. 1G is a diagram of the first page in the flash mass storage block.

FIG. 1G is a diagram of the first page in the flash mass storage block. This page is automatically read on power-up starting with the first data bytes. Flash memory space 200 has stored in it a first copy of boot loader program 202, starting at the first address on the first page. Backup copy 204 of the boot loader program follows boot loader program 202 and can be loaded in case of error.

Two copies 206, 208 of a control program are stored in flash memory space 200. When one copy contains an error, the other copy can be loaded. An image for the operating system (O/S) can be stored as OS image 209. OS image 209 can be a compiled executable code recognized only by the CPU. An image code has a minimum size and is more secure, protecting privacy.

The remaining addresses on the first page, and on subsequent pages of flash memory space 200 are used for user storage 210. Data from the host can be stored in user storage 210. Configuration data 211 may be present when error-correction is supported, such as when using Reed-Solomon error-correction code (ECC). Configuration data 211 contains error-correction data and may be located at the end of the address space.

Figure 1H:
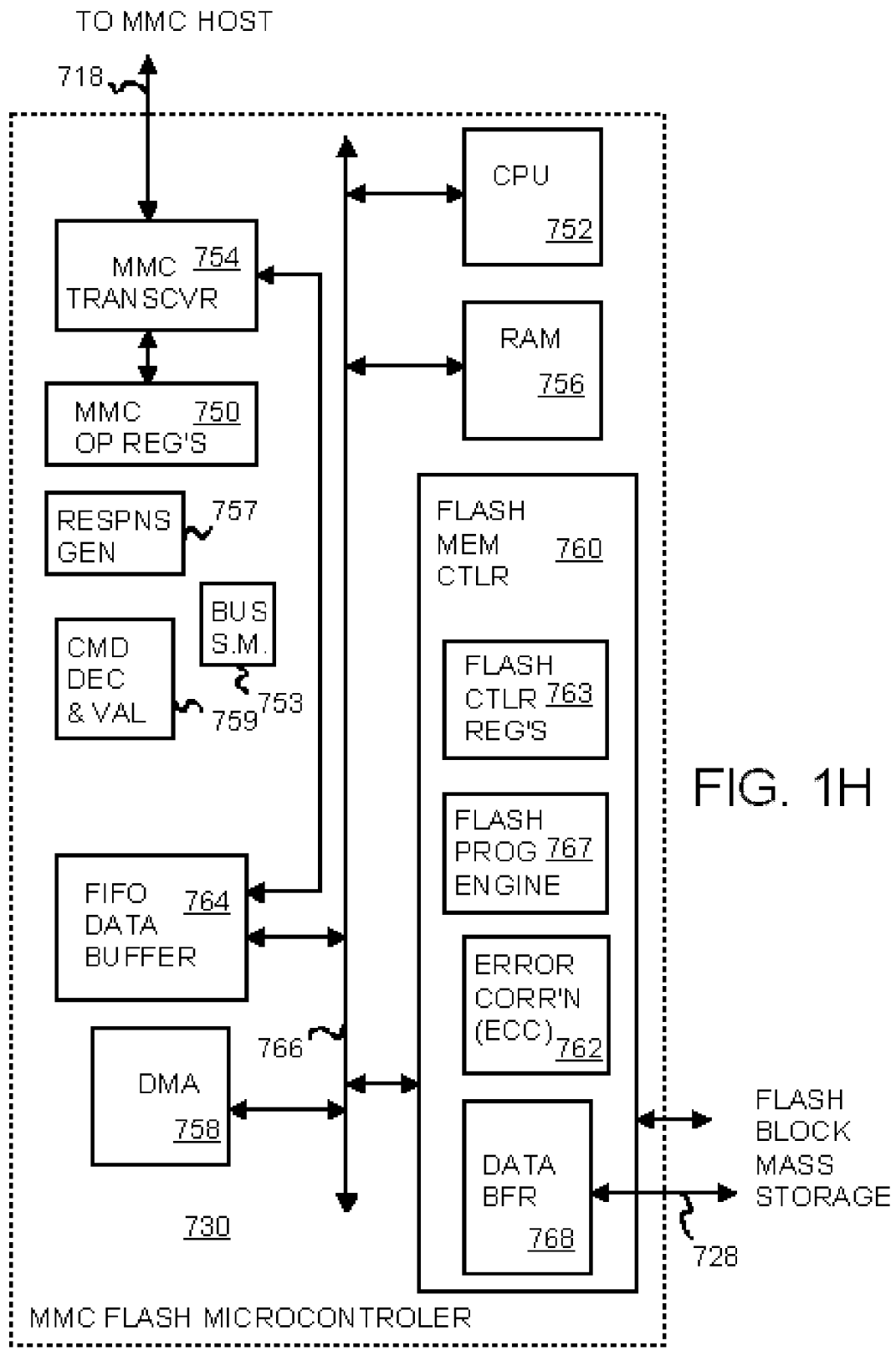
FIG. 1H is a block diagram of the MMC flash microcontroller inside the MMC single-chip flash device.

FIG. 1H is a block diagram of the MMC flash microcontroller inside the MMC single-chip flash device. Internal bus 766 connects CPU 752 with RAM 756, FIFO data buffer 764, direct-memory access (DMA) engine 758, and flash-memory controller 760. CPU 752 executes instructions from RAM 756, while DMA engine 758 can be programmed to transfer data between FIFO data buffer 764 and flash-memory controller 760. CPU 752 can operate on or modify the data by reading the data over bus 766. RAM 756 can store instructions for execution by the CPU and data operated on by the CPU.

MMC transceiver 754 connects to the clock CLK and parallel data lines D0:7 of MMC bus 718 and contains both a clocked receiver and a transmitter. An interrupt to CPU 752 can be generated when a new command is detected on MMC bus 718. CPU 752 can then execute a routine to handle the interrupt and process the new command.

MMC operating registers 750 include the protocol registers required by the MMC specification. Registers may include a data-port, write-protect, flash select, flash status, interrupt, and identifier registers. Other extension registers may also be present.

Command decode and validator 759 detects, decodes, and validates commands received over MMC bus 718. Valid commands may alter bus-cycle sequencing by bus state machine 753, and may cause response generator 757 to generate a response, such as an acknowledgement or other reply.

The transmit and receive data is stored in FIFO data buffer 764, perhaps before or after passing through a data-port register in MMC operating registers 750. Commands and addresses from the MMC transactions can also be stored in FIFO data buffer 764, to be read by CPU 752 to determine what operation to perform.

Flash-memory controller 760 includes flash data buffer 768, which may contain the commands, addresses, and data sent over internal flash buses 728 to flash mass storage blocks 722, 723, 724. Data can be arranged in flash data buffer 768 to match the bus width of internal flash buses 728, such as in 32 or 64-bit words. DMA engine 758 can be programmed by CPU 752 to transfer a block of data between flash data buffer 768 and FIFO data buffer 764.

Flash control registers 763 may be used in conjunction with flash data buffer 768, or may be a part of flash memory buffer 768. Flash-specific registers in flash control registers 763 may include a data port register, interrupt, flash command and selection registers, flash-address and block-length registers, and cycle registers.

Error-corrector 762 can read parity or error-correction code (ECC) from flash mass storage blocks 722, 723, 724 and perform data corrections. The parity or ECC bits for data in flash data buffer 768 that is being written to flash mass storage blocks 722, 723, 724 can be generated by error-corrector 762.

Flash programming engine 767 can be a state machine that is activated on power-up reset. Flash programming engine 767 programs DMA engine 758 within the address of the boot loader code in the first page of flash mass storage block 722, and the first address in RAM 756. Then flash programming engine 767 commands DMA engine 758 to transfer the boot loader from flash mass storage block 722 to RAM 756. CPU 752 is then brought out of reset, executing the boot loader program starting from the first address in RAM 756. The boot loader program can contain instructions to move a larger control program from flash mass storage block 722 to RAM 756. Thus MMC flash microcontroller 730 is booted without an internal ROM on internal bus 766.

Figure 2A:
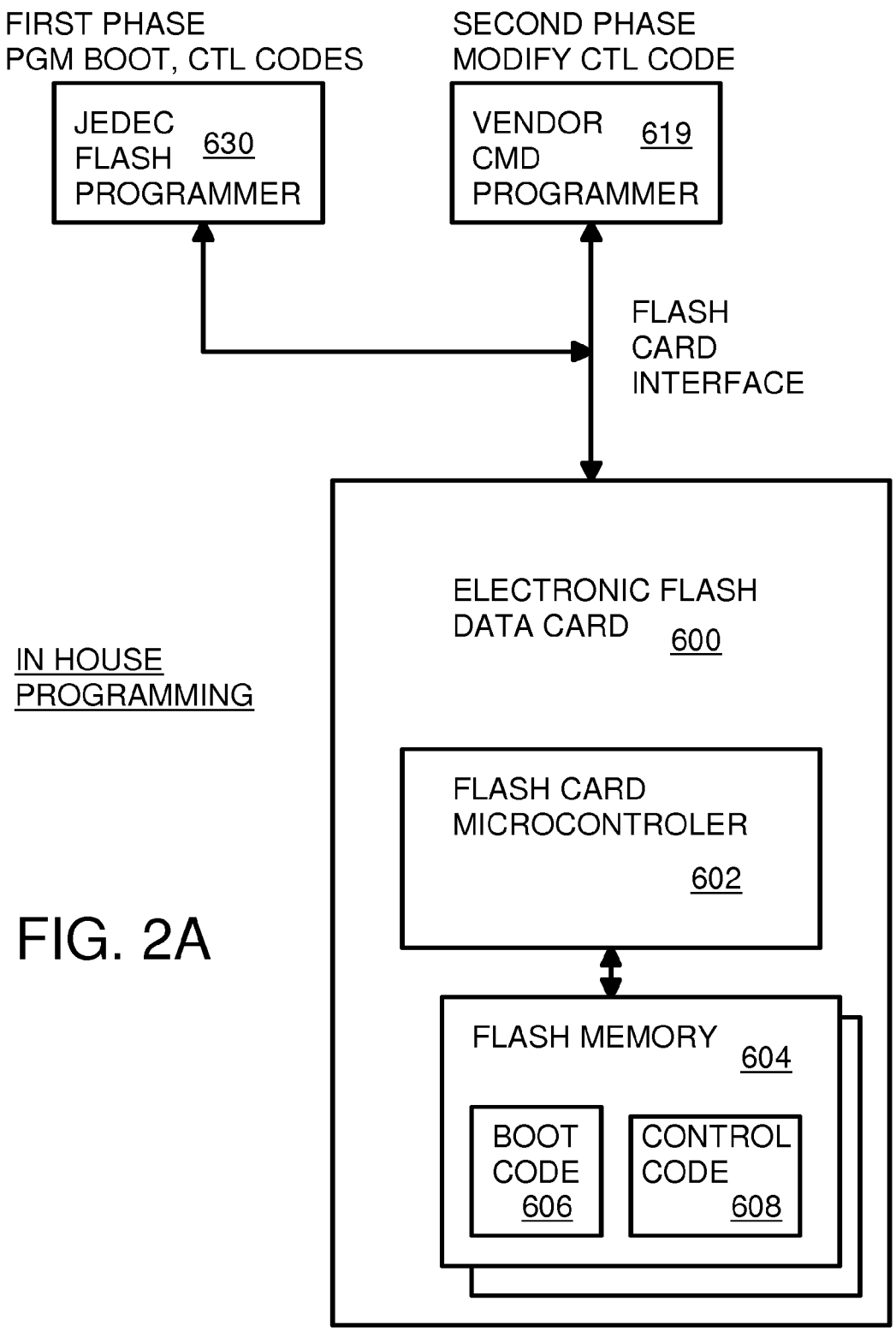
FIG. 2A is a block diagram of a flash memory system in accordance with the present invention.

FIG. 2A is a block diagram of a flash memory system in accordance with the present invention. Flash memory system 600 includes a flash memory controller 602 and a flash memory 604. Flash memory 604 stores boot code 606 and control code 608. Note that the term flash memory represents one or more flash memory devices. If there are more than one flash memory device, boot code 606 and control code 608 can be stored on one of the flash memory devices or alternatively can be stored on multiple flash memory devices.

Before flash memory system 600 is shipped to an end user, information is stored in flash memory system 600 to ensure that it functions correctly. The information includes boot code 606 and control code 608, as well as information specific to the flash memory (e.g., manufacturer, identification, etc.). Boot code 606 is software that initializes flash memory system 600 during the early phase of the booting sequence. Boot code 606 also determines the amount of available memory and determines how to access it. Control code 608 contains necessary information for exercising the initial booting sequence and information for enabling flash memory controller 602 to access flash memory 604. Control code 608 includes parameter settings and a detailed list of information relating to flash memory device, as well as card identification (card ID) and card specific data (CSD).

Because boot code 606 and control code 608 are stored in the flash memory device instead of the flash memory controller ROM, the code in the ROM as well as the physical size of the ROM can be minimized. Jedec programmer 630 can be used to directly program flash memory 604 during an initial phase during manufacturing. Both boot code 606 and control code 608 are written in the first phase. In a second phase during manufacturing, vendor command programmer 619 modifies control code 608.

Because the boot code and control code is stored in flash memory 604, different brands or types of flash memory can be supported by the same flash memory controller 602 without having to change it. As such, the flash memory controller is universal to various brands and types of flash memory. This is because each flash memory device of flash memory 604 stores the boot and control code unique to each flash memory. Parameters for different types of flash memory device are defined in the control code and in a library image file. Accordingly, a single flash memory controller can support multiple brands and multiple types of flash memory. In other words, the flash memory controller would not have to be changed for each brand or type of flash memory. This significantly reduces the inventory when various cards having different specifications (i.e., different flash memories) are in mass production.

Furthermore, because the boot code and the control code are stored in the flash memory, the boot and control codes can be updated in the field. As such, the end user can download updated code. Such code can be provided via various means including Internet web support, e-mail, etc., and can be downloaded using a PC.

Figure 2B:
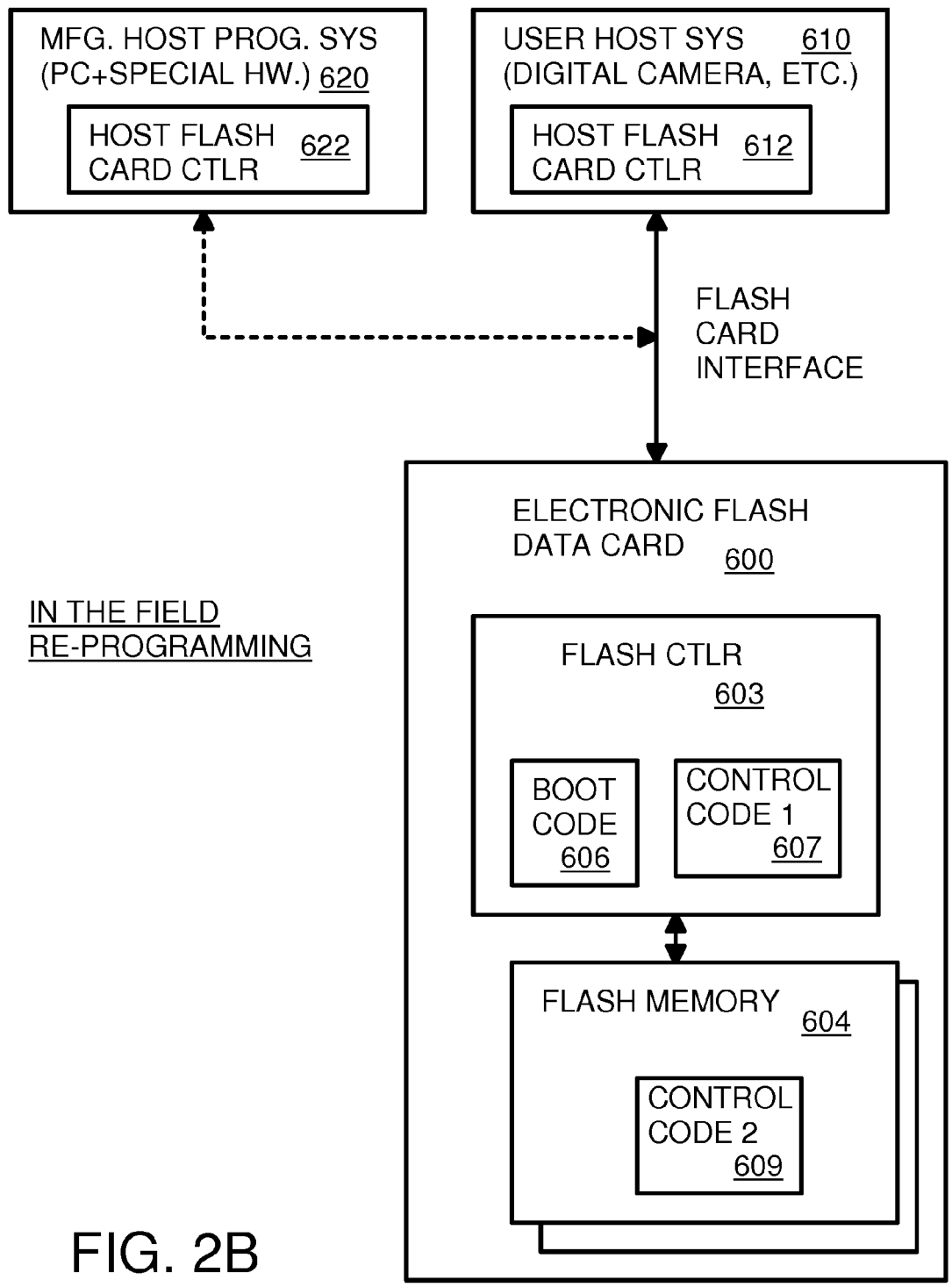
FIG. 2B is a block diagram of a flash memory system in accordance with an alternative embodiment of the present invention.

FIG. 2B is a block diagram of a flash memory system in accordance with an alternative embodiment of the present invention. Similar to conventional systems, flash memory system 600 includes boot code 606 and a first version of control code 607 (i.e., "Control code 1") in the ROM portion of flash controller 603, and also includes an updated version of control code 609 (i.e., "Control code 2") in flash memory 604. In this embodiment, the boot code is loaded into RAM and is used to determine whether initial control code 607 or updated control code 609 are to be used. This embodiment does not allow updates to the boot code, and does not minimize the ROM size as in the embodiment shown in FIG. 2A, but facilitates updates to the control code that allow, for example, bugs in initial control code 607 to be addressed in the field.

Flash memory system 600 is adapted to be coupled to user host 610 during normal-mode operation. User host 610 includes a host flash card controller 612.

During the programming-mode, flash memory system 600 is adapted to be coupled to manufacturer host 620. Manufacturer host 620 can be a personal computer (PC) with special hardware. Manufacturer host 620 includes host flash card controller 622, which can be a special card interface controller dedicated to volume production of flash cards. Upon completion of the programming, manufacturer host 620 diagnoses flash memory system 600 to ensure that it is functioning properly.

In normal-mode operation, flash memory system 600 stores data that is provided by user host 610, which may be a digital camera or PC or another host. Flash memory system 600 is implemented as a flash card. Flash memory system 600 can store various types of data including image data and other types of multi-media data. Accordingly, Flash memory system 600 can also be referred to as a multi-media card (MMC). The data stored in flash memory system 600 can be later sent as file attachment in an e-mail, printed, or transferred to another host.

User host card controller 612 handles flash card protocol translation between flash memory system 600 and user host 610, which enables user host 610 to transfer files so that various host operating system (OS) software can share information. For example, user host card controller 612 enables data to be read by a user PC via email. Software in user host 610 handles file system functions, such as providing a file application interface and a user accessible device driver.

Figure 2C:
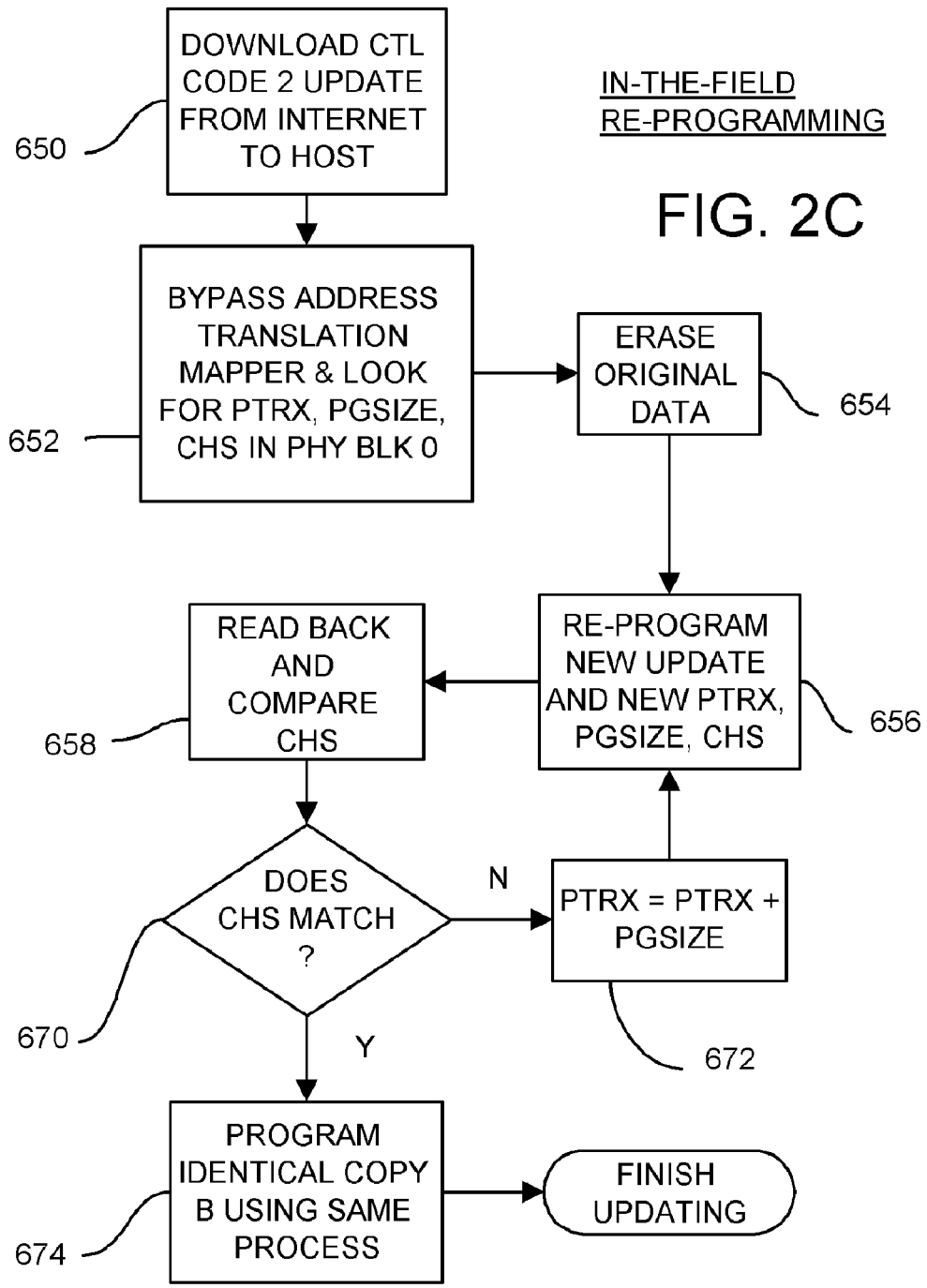
FIG. 2C is a flowchart of in-the-field re-programming of the flash device.

FIG. 2C is a flowchart of in-the-field re-programming of the flash device. The update for control code 2 is downloaded from the Internet, step 650. The address translation mapper is bypassed, and the pointer to the control code, PTRX, the page size PGSIZE, and the checksum CHS are read in from physical block 0 of control code 2 (609 in FIG. 2B), step 652. The original data in flash is erased, step 654. The new update is written to flash, step 656, with the new pointer, page size, and checksum. The updated control code is verified by reading it out of flash memory, step 658. The checksums are compared. When the checksums match, step 670, then a second copy B is programmed in the same manner, step 674, and updating finishes.

When the checksums mis-match, step 670, then the pointer PTRX is incremented by the page size to point to the next page, step 672. Then the new update is written to this next page in flash, step 656, with the new pointer, page size, and checksum. The updated control code is again verified by reading it out of flash memory, step 658. The process is repeated for other pages until a good page in flash is found.

Figure 2D:
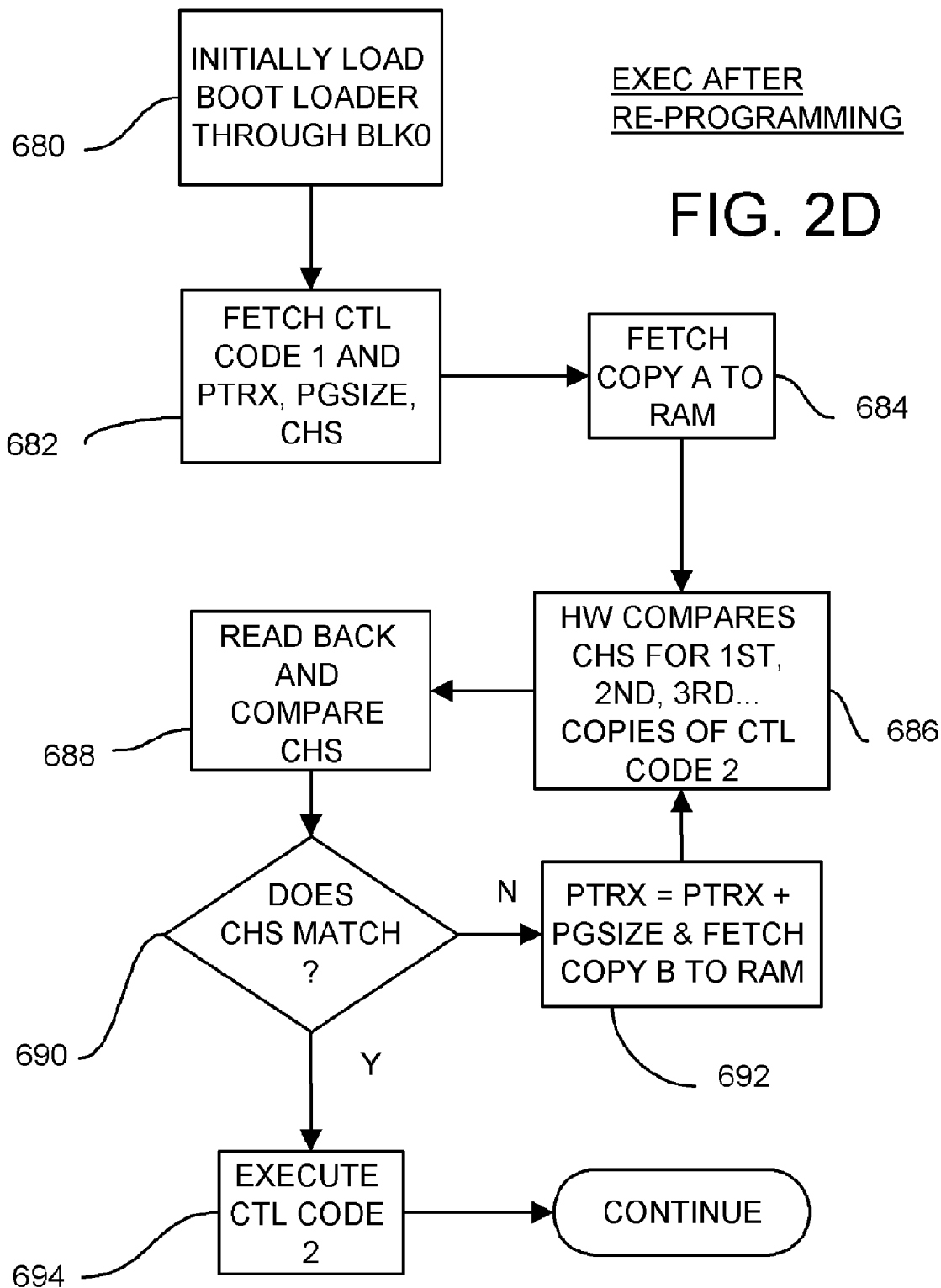
FIG. 2D is a flowchart of execution after in-the-field re-programming of the flash device.

FIG. 2D is a flowchart of execution after in-the-field re-programming of the flash device. The boot loader program is initially loaded, step 680. The control code 1 is fetched from flash and the pointer to the control code, PTRX, the page size PGSIZE, and the checksum CHS are read in from physical block 0 of control code 2 (609 in FIG. 2B), step 682. The A copy is fetched to RAM, step 684. The hardware compares the checksums for all copies of control code 2 in this page, step 686. The fetched control code is verified by reading it out of flash memory, step 688. The checksums are compared. When the checksums match, step 690, then control code 2 can be executed, step 694, and execution continues.

When the checksums mis-match, step 690, then the pointer PTRX is incremented by the page size to point to the next page, step 692. The B copy of control code 2 is read from flash memory. The hardware compares the checksums for all copies of control code 2 in this new page, step 686. The fetched control code is verified by reading it out of flash memory, step 688. The checksums are compared. The process is repeated for other pages until a good page in flash is found.

Figure 2E:
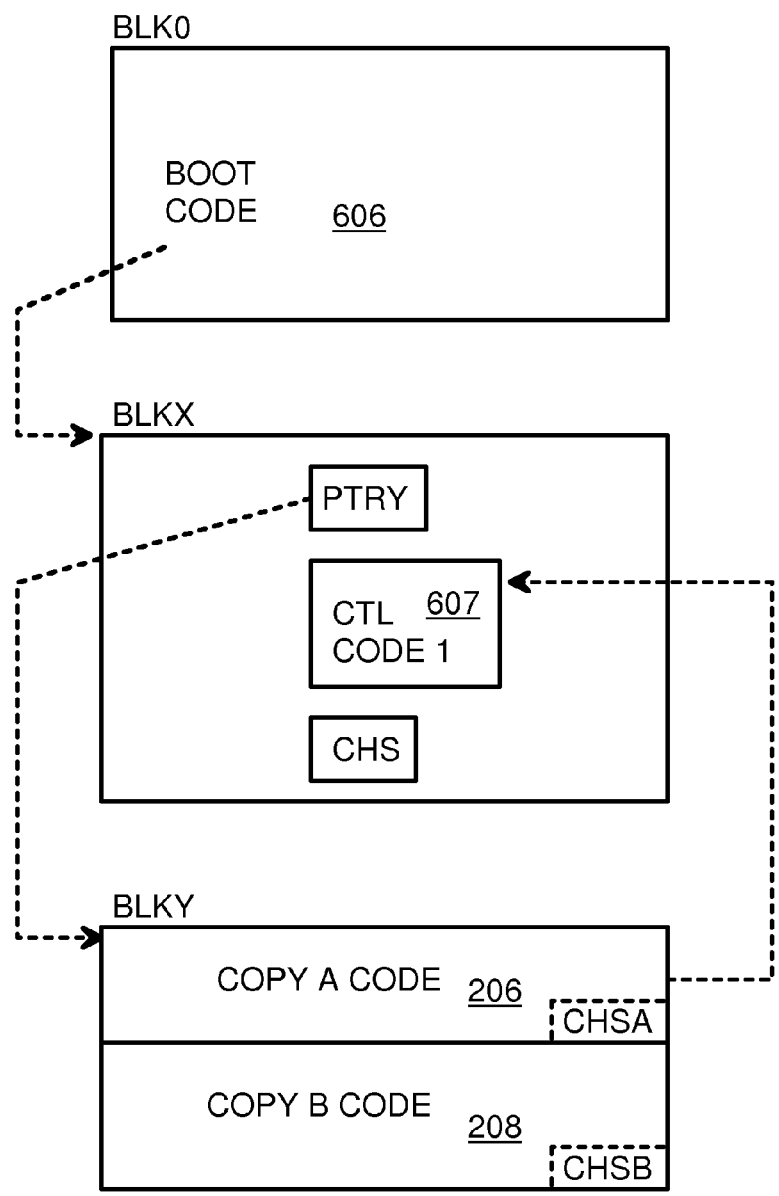
FIG. 2E shows the relationships between physical blocks used for booting.

FIG. 2E shows the relationships between physical blocks used for booting. Block BLK0 stores boot code 606. The main task of boot code 606 is to fetch control code 1 607 from a specified fixed physical block address in boot code 606. If this fixed physical block address is not available or if the block is a bad block, then the device is bad and not fixable.

Block BLKX contains operating system parameters, such as the total capacity in blocks, the number of pages per block, and the location of BLKY, so that control code 1 607 can find control code 2. It also holds parameters such as the pointer PTRY for the location for BLKY, the PageSize of Copy A code 206, and CHSA, a checksum of Copy A 206. Copy B 208 follows Copy A as an identical backup copy. For cost reasons, Copy B can be an optional one to release the data areas occupied as a means to save space but sacrifice the usually redundancy safety measures.

Block BLKY is the major code residing place, with a checksum CHS at the end of each copy 206, 208.

FIG. 3 shows a microcontroller with multiple memory interfaces. MMC flash microcontroller 100 has a local processor that is booted from attached memory. MMC flash microcontroller 100 can be a controller for a portable device such as a phone, camera, PDA, media player, etc. MMC flash microcontroller 100 can read and write data from RAM 34 using memory interface 24, which drives addresses onto address bus 15 and transfers data over memory data bus 14. Non-Volatile (NV) flash memory 35 is also connected to buses 14, 15 and can be read by memory interface 24, since NV flash memory 35 is byte or word addressable as is RAM 34.

Boot code can reside in NV flash memory 35 since memory interface 24 can read individual bytes or words from NV flash memory 35. Words can be a few bytes, such as 4 bytes, 8 bytes, or 16 bytes. Words are much smaller than the 512-byte sectors or pages that are accessed by a mass-storage device.

MMC flash microcontroller 100 can also read pages of data from flash memory 38. Flash interface 28 generates commands and transfers 512-byte blocks of data over flash bus 18 to flash memory 38.

MMC flash microcontroller 100 may also connect to one or more removable Multi-Media Card (MMC) cards or to a MMC host on a MMC bus. MMC interface 26 generates and receives commands or clock signals on MMC command bus 17, and transfers data packets over MMC bus 16 to a MMC card.

A host such as a PC may connect to MMC flash microcontroller 100 over MMC bus 16, or over a separate host bus. Host interface 22 can connect directly to a host over a host bus. Host interface 22 is optional and not needed when the host connects over MMC bus 16.

Figure 4:
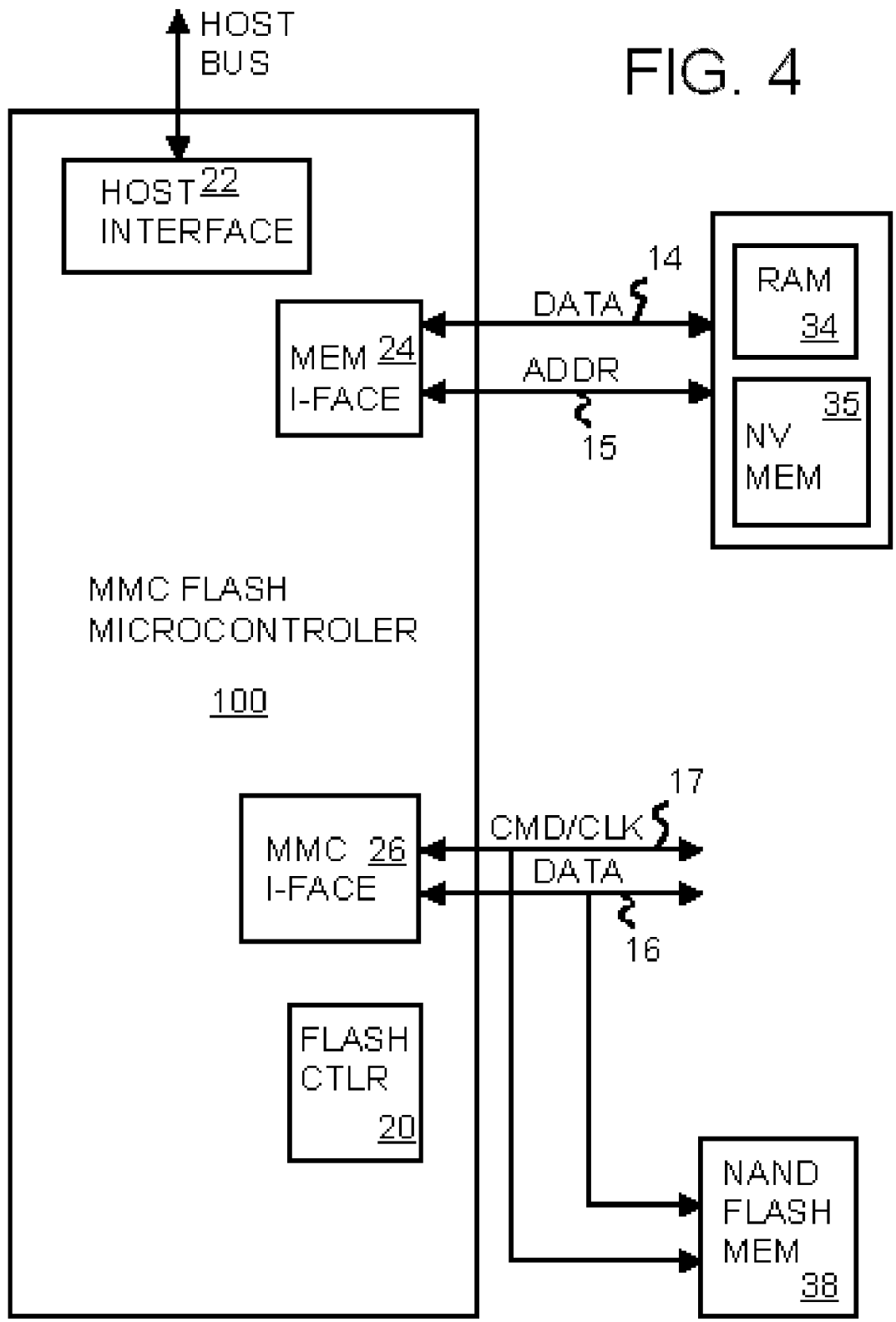
FIG. 4 shows a microcontroller with a shared flash/MMC interface.

FIG. 4 shows a microcontroller with a shared flash/MMC interface. Flash memory 38 is able to transfer data on MMC bus 16. When flash memory 38 is accessed, flash controller 20 generates packets containing flash commands that are sent over MMC bus 16 by MMC interface 26. Flash memory 38 reads these packets to extract the flash commands, and responds with flash data that is encapsulated in packets that are sent over MMC bus 16. The flash interface is similar enough to the MMC interface that some kinds of flash memory 38 may be installed directly on MMC bus 16. This bus sharing reduces the pincount of MMC flash microcontroller 100, reducing cost.

Figure 5:
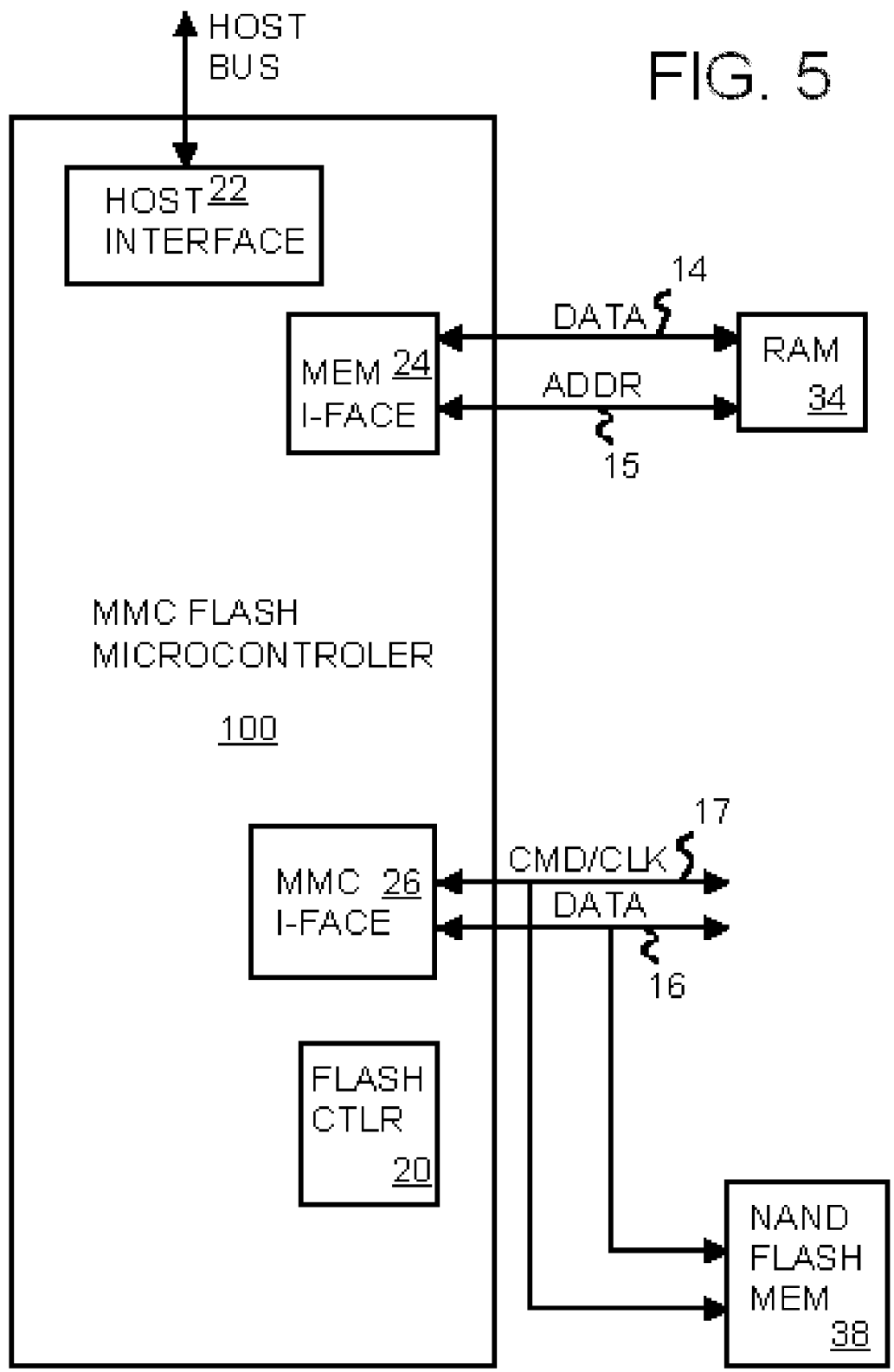
FIG. 5 shows a MMC flash microcontroller without a separate NOR flash memory.

FIG. 5 shows a MMC flash microcontroller without a separate NOR flash memory. NV flash memory 35 of FIGS. 3-4 is removed. Instead, a state machine or other hardwired logic inside MMC flash microcontroller 100 acts as an initial boot loader, reading boot code from a first block and first page of flash memory 38. MMC interface 26 is activated to read the initial boot loader code from flash memory 38 during initialization.

Figure 6:
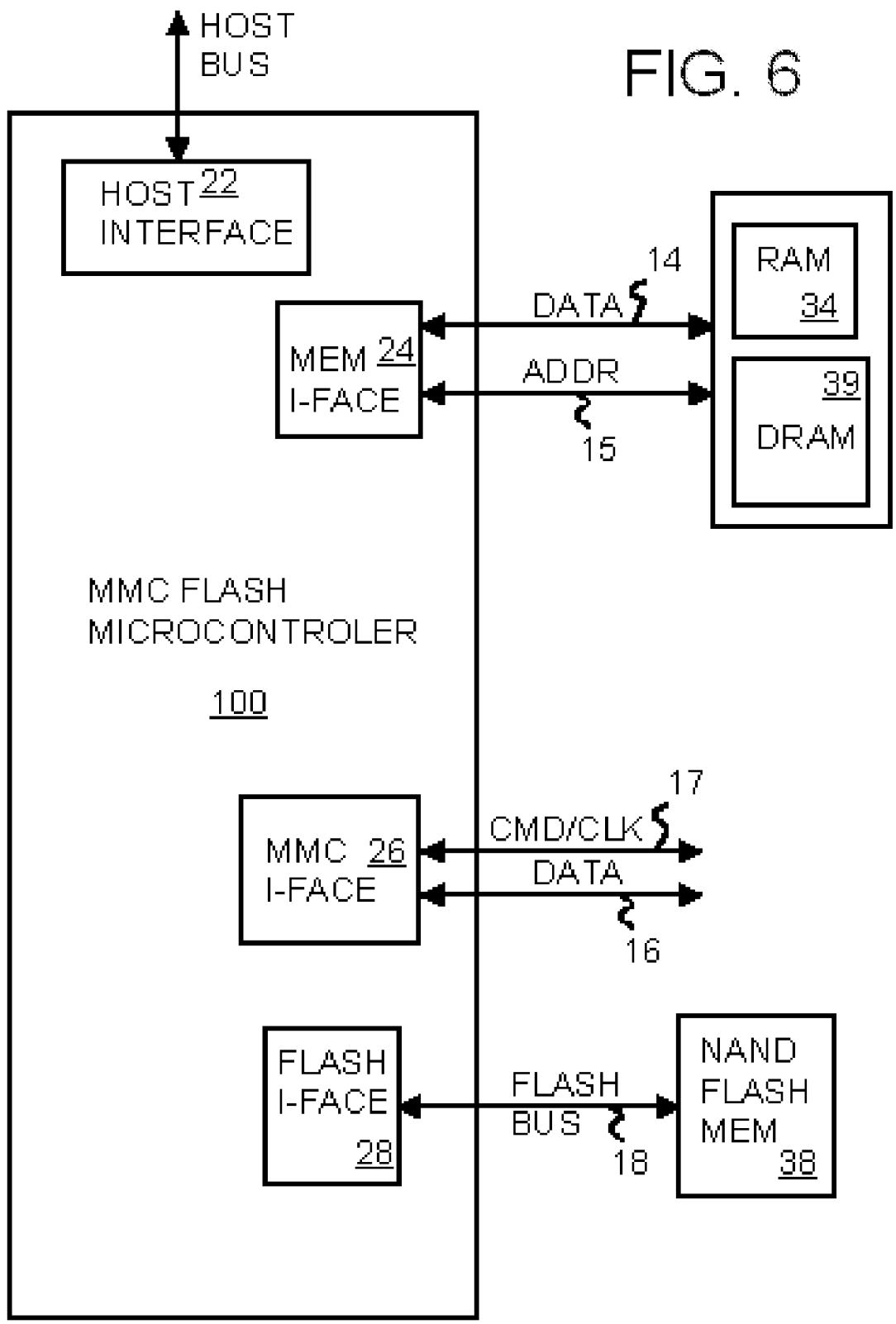
FIG. 6 shows a MMC flash microcontroller with a DRAM-SRAM interface.

FIG. 6 shows a MMC flash microcontroller with a DRAM-SRAM interface. RAM 34 can be a static RAM, while DRAM 39 is a dynamic-random-access memory (DRAM). Memory interface 24 is able to generate DRAM control signals and SRAM control signals, using memory data bus 14 to access both RAM 34 and DRAM 39.

Memory interface 24 may have both a SRAM and a DRAM interface. Additional pulsed control signals such as RAS, CAS (not shown) may be used by memory interface 24 for accessing DRAM 39, and addresses may be multiplexed for row and column addresses. DRAM 39 allows for a much larger memory size at a lower cost than RAM 34. However, memory interface 24 must generate the additional DRAM control signals and ensure that DRAM 39 is refreshed, either using external refresh, or an internal refresh controller within DRAM 39.

Flash memory 38 can reside on flash bus 18 and connect directly to flash interface 28, or may reside on MMC bus 16 as shown in FIGS. 4-5. Host interface 22 may not be present on some embodiments.

Figure 7A:
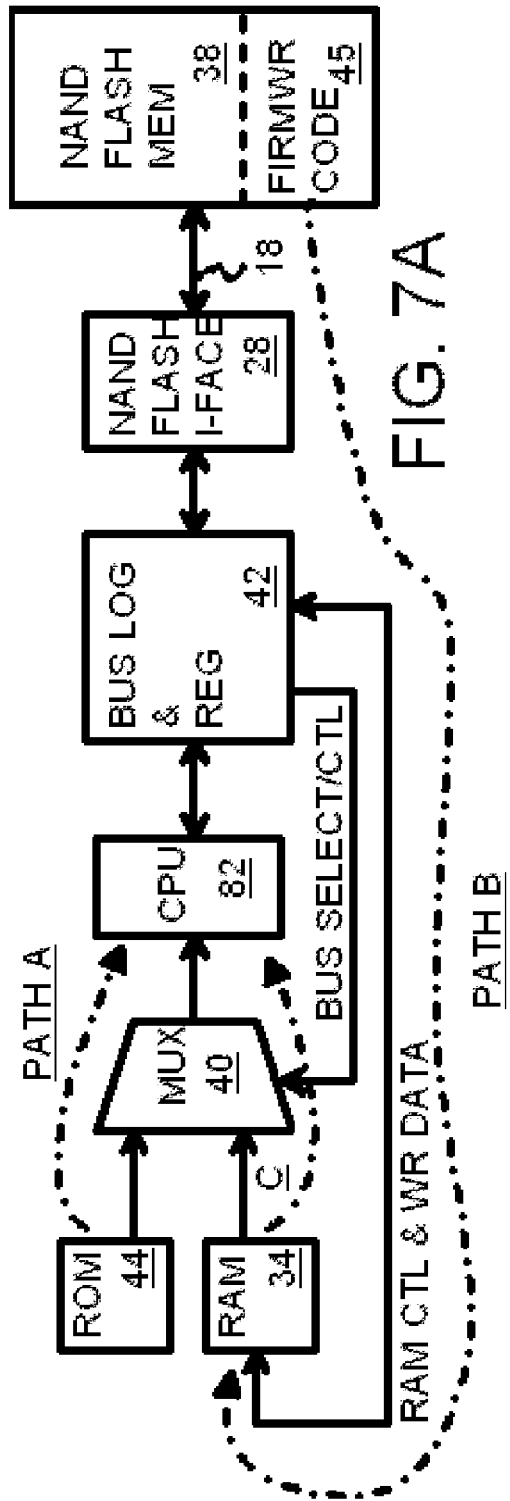
FIGS. 7A-B highlights dual-memory booting from both a RAM and a ROM.

FIG. 7A highlights dual-memory booting from both a RAM and a ROM. Blocks are shown in a flow-path diagram to highlight data flows during booting. After power is first applied and CPU 82 leaves reset, instructions are fetched from ROM 44, which could be a small ROM or hardwired logic in MMC flash microcontroller 100. Mux 40 connects ROM 44 to CPU 82. Bus logic and registers 42 include control registers and logic that control mux 40, allowing initial boot instructions to flow over path A from ROM 44 to CPU 82.

The initial instructions from ROM 44 include a boot loader program that reads pages of data from flash memory 38. Firmware code 45 is read from flash memory 38 by flash interface 28 and sent over path B to be written into RAM 34, which can be the external RAM accessed through a RAM interface.

Once firmware code 45 is copied to RAM 34, the initial boot loader program executing on CPU 82 writes a control register in bus logic and registers 42 that toggles to a RAM_BASE mode. In the RAM_BASE mode, bus logic and registers 42 controls mux 40 to connect RAM 34 to CPU 82, rather than ROM 44. Instructions from the copy of firmware code 45 that was written to RAM 34 are now read directly by CPU 82 over path C. Further data can be read from flash memory 38 by CPU 82 until the OS is installed and can execute user programs.

Figure 7B:
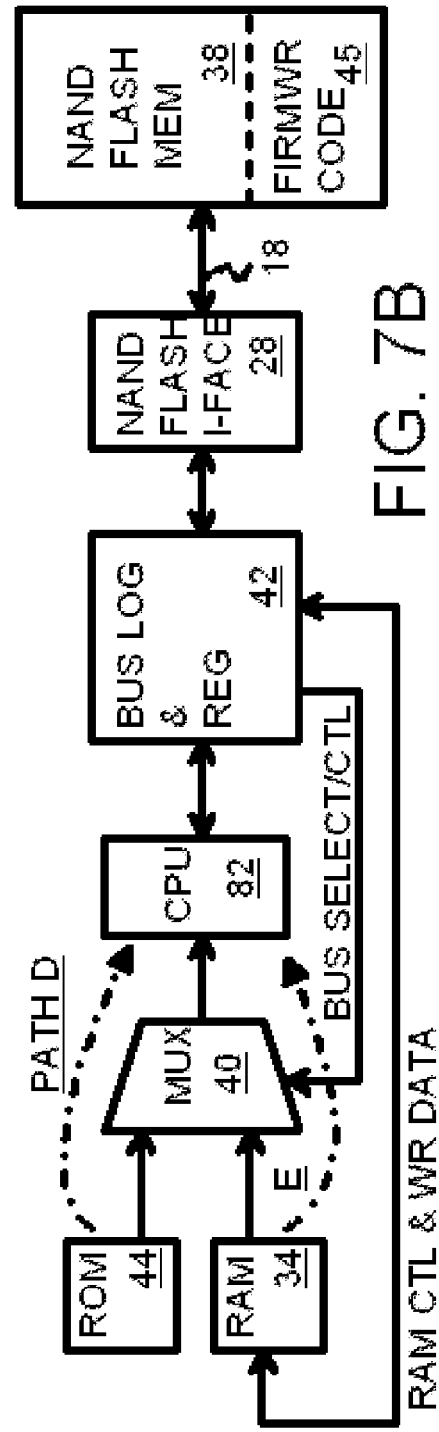

In some embodiments, CPU 82 can read directly from either ROM 44 or from RAM 34 by changing the controls to mux 40. For example, a control register in bus logic and registers 42 can be written by CPU 82 to toggle between reading ROM 44 and RAM 34. FIG. 7B shows that instructions are read over path D from ROM 44 when RAM_BASE is 0, and over path E from RAM 34 when RAM_BASE is set to 1. A reset may be required in some embodiments when RAM_BASE is changed.

FIG. 8 is a flowchart of booting from ROM and RAM by toggling a RAM_BASE bit and resetting. When power is applied and the CPU comes out of reset, a search is made in the flash memory for the initial boot code, step 352. The boot code may be located at the first page of the first block of flash, and some flash memory chip may automatically transfer this data after a reset or power-on. Otherwise, the CPU or other logic searches for the boot code by reading the first page of flash. The existence of boot code can be determined by matching a signature or other data in the first few bytes of the first page. For example, a special flag such as AA55 may be placed at the beginning of the boot code, and the logic can check for this value to determine if the search was successful. If there is no boot code present, then a default value such as FFFF is read from the flash memory.

When the search of the flash was not successful and boot code was not found in flash, step 354, then the RAM_BASE bit is cleared. Mux 40 or other bus logic connects ROM 44 to CPU 82, and boot code is read from ROM 44 and executed, step 366.

When the search of the flash was successful and found boot code, step 354, then boot code is read from flash memory, step 356. This boot code is written to external RAM 34 through external RAM interface 86, or to a small boot RAM inside MMC flash microcontroller 100. When this load from flash memory is not successful, step 358, then the RAM_BASE bit is cleared. Mux 40 or other bus logic connects ROM 44 to CPU 82, and boot code is read from ROM 44 and executed, step 366.

When this load from flash memory is successful, step 358, then the RAM_BASE bit is set to 1, step 360. This causes bus logic and registers 42 to control mux 40 to connect RAM 34 to CPU 82, rather than ROM 44. Bus logic and registers 42 generates a reset pulse, step 362, and after reset CPU 82 reads instructions from the first address in RAM 34, which is the boot loader code earlier read from flash memory in step 356. Boot code is read from RAM and executed, step 364. Once the OS is loaded, user programs or other applications can be executed.

Figure 9:
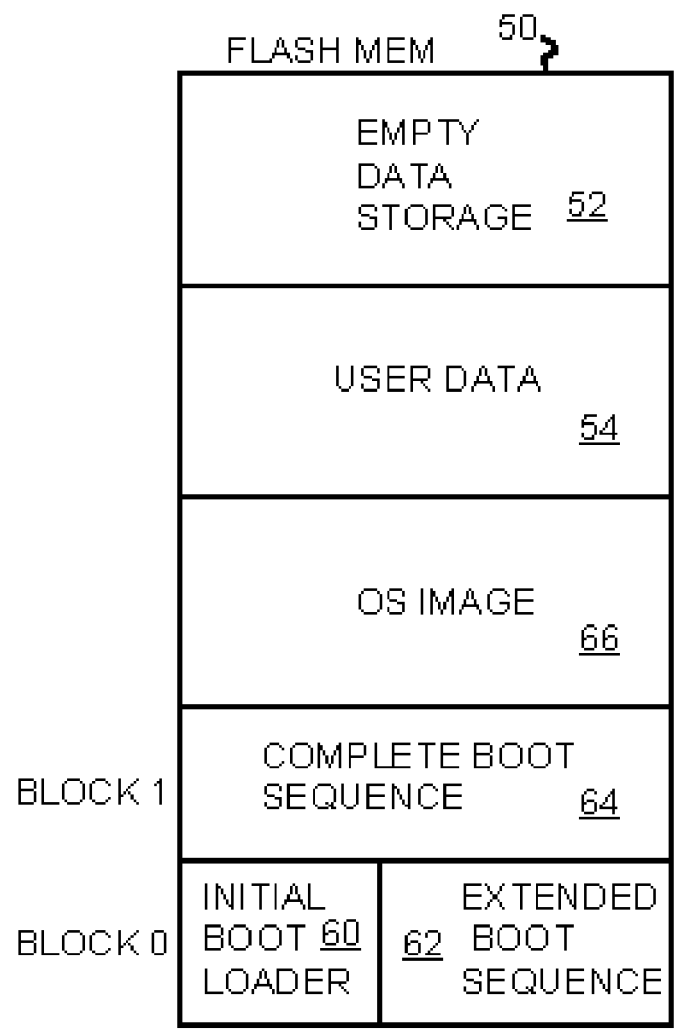
FIG. 9 shows boot code stored in a NAND flash memory.

FIG. 9 shows boot code stored in a NAND flash memory. NAND flash memory 50 is block-accessible, allowing pages in a block to be written just once before the whole block is erased. Entire pages are read as a 512-byte page; individual bytes cannot be read or written.

NAND flash memory 50 stores initial boot loader 60 at the first page of the first block. Extended boot sequence 62 is stored after initial boot loader 60 in the other pages of the first block. Complete boot sequence 64 is stored in the next block. OS image 66 is stored next, after complete boot sequence 64.

User data 54 is the main user or application data stored by flash memory 50. Unused user storage 52 is available for new data.

Figure 10:
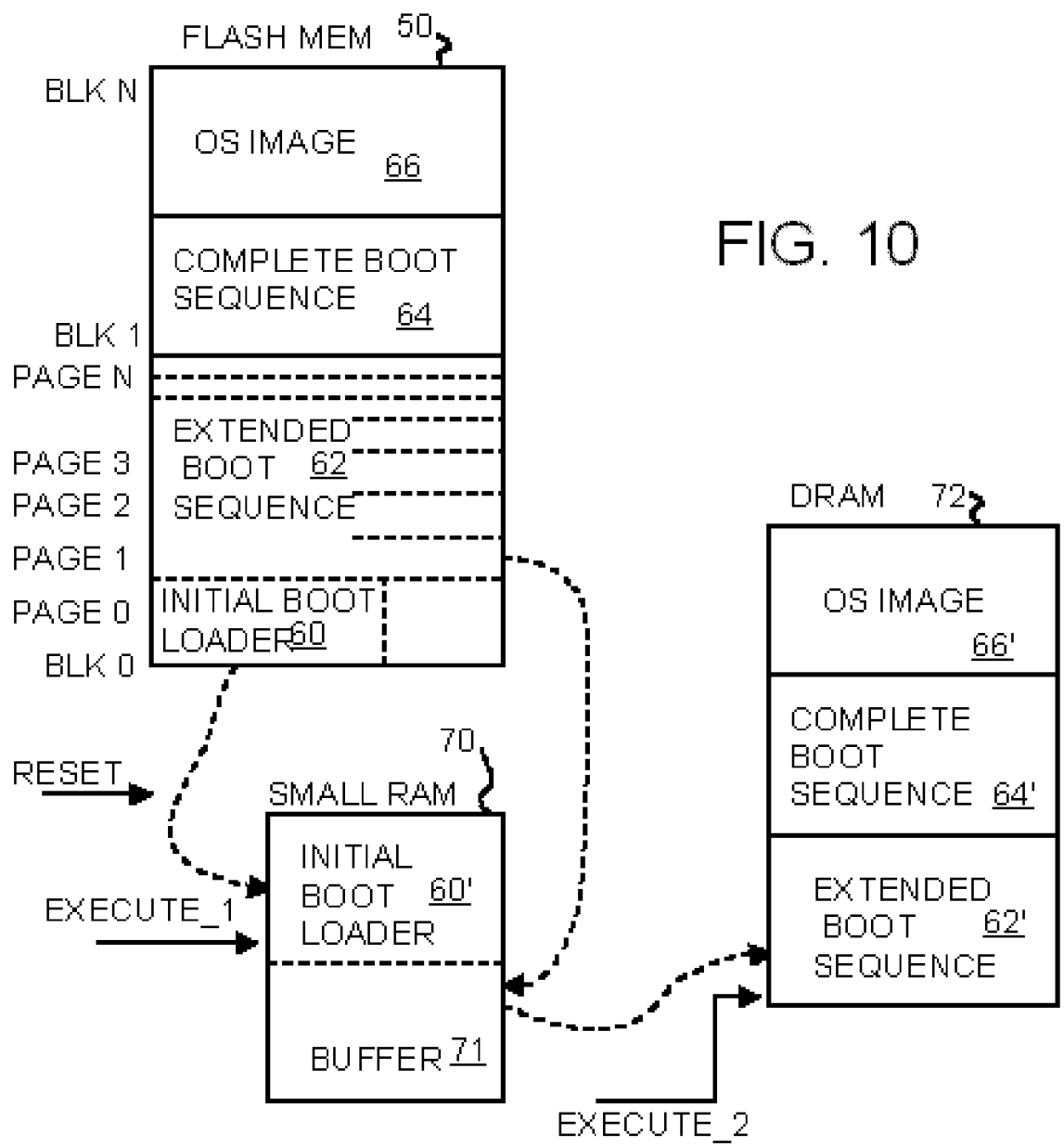
FIG. 10 highlights booting the MMC flash microcontroller from multiple memories.

FIG. 10 highlights booting the MMC flash microcontroller from multiple memories. DRAM 72 is volatile, losing all data when power is lost. DRAM 72 can be external to MMC flash microcontroller 100. Small RAM 70 is a small RAM on MMC flash microcontroller 100 that is used during booting. Small RAM 70 may be a SRAM that is used for other purposes after booting is complete, such as being used as a cache or as a FIFO buffer. Small RAM 70 could be part of a RAM array that includes a cache or FIFO 764 of FIG. 1H. Small RAM 70 could be as small as 2 pages (1K bytes) in size.

Small RAM 70 is also volatile, losing data when power is lost. Flash memory 50 is non-volatile, retaining data such as boot code. However, code cannot be executed directly from flash memory 50, since flash memory 50 is block-addressable. A whole page must be read from flash memory 50, rather than individual cache lines or instructions.

After reset, a state machine or other hardware in MMC flash microcontroller 100 reads the first page of the first block of flash memory 50. This first page contains initial boot loader 60, which is written by the hardware state machine into small RAM 70. Initial boot loader 60 may occupy the entire 512-byte first page, or just part of the first page, or multiple pages.

After loading initial boot loader 60 into small RAM 70, the CPU exits reset and begins fetching instructions from the first address in small RAM 70. Initial boot loader copy 60' is located there, causing initial boot loader copy 60' to be executed directly by the CPU. Initial boot loader copy 60' contains CPU instructions that cause the CPU to read the remaining pages in the first block of flash memory 50. These pages contain extended boot sequence 62. The remaining area of small RAM 70 is used as temporary buffer 71 to store pages of extended boot sequence 62 as they are copied to DRAM 72 and stored as extended boot sequence copy 62'.

Once all pages of extended boot sequence 62 have been copied to DRAM 72, then the CPU writes to registers in bus logic and registers 42 to alter bus muxing. Rather than read instructions from small RAM 70, the CPU reads instructions from DRAM 72, such as through a DRAM interface. The CPU may be reset to cause it to again fetch instructions from address 0, which is now the first address in DRAM 72.

Instructions from extended boot sequence copy 62' are now read and executed by the CPU. These instructions include routines to read complete boot sequence 64 from the next block of flash memory 50, and to write these instructions to DRAM 72 as complete boot sequence copy 64'. As the last instruction of extended boot sequence copy 62' is executed, the next instruction fetched is from complete boot sequence copy 64', either fetching sequentially or by a jump or branch.

Complete boot sequence copy 64' is then executed by the CPU. Complete boot sequence 64 includes instructions to read OS image 66 from flash memory 50, and to write it to DRAM 72 as OS image copy 66'. As the last instruction of Complete boot sequence copy 64' is executed, the next instruction fetched is from OS image copy 66', either fetching sequentially or by a jump or branch. After the OS starts, user or application programs may be loaded and executed.

Figure 11A:
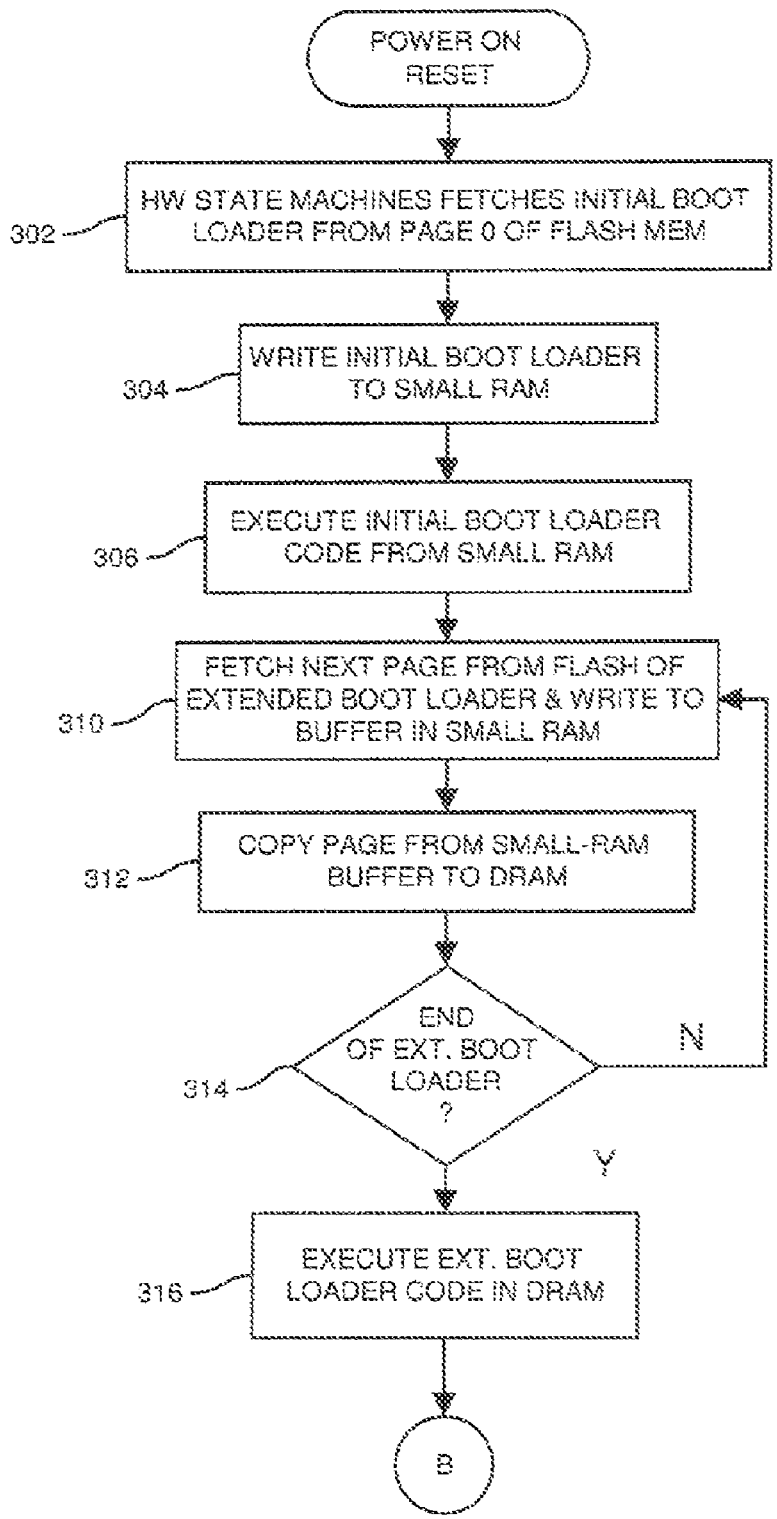
FIGS. 11A-B is a flowchart of booting a MMC flash microcontroller from flash, SRAM, and DRAM.
Figure 11B:
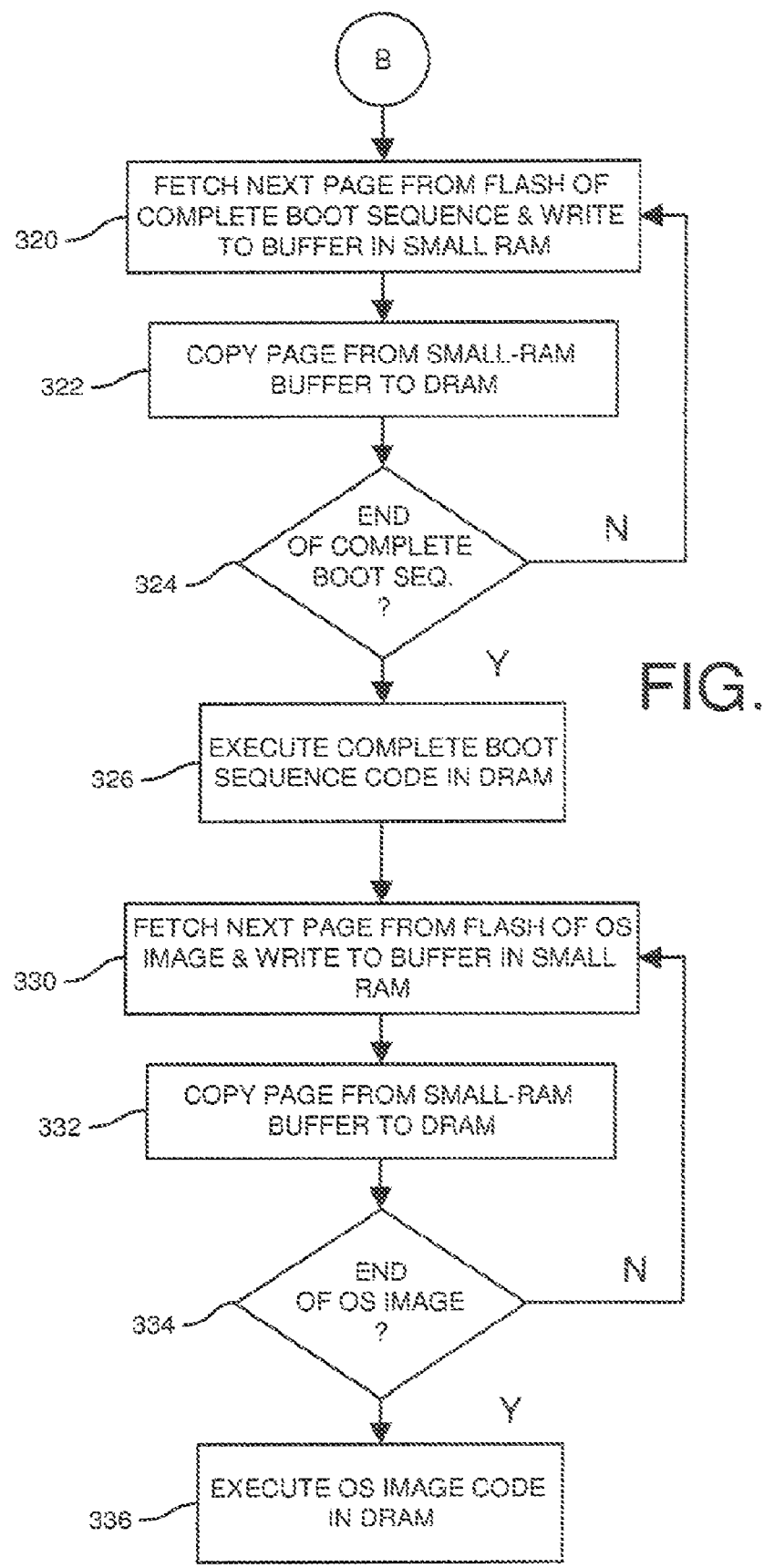

FIGS. 11A-B is a flowchart of booting a MMC flash microcontroller from flash, SRAM, and DRAM. In FIG. 11A, when power is turned on the chips are reset, including MMC flash microcontroller 100. A hardware state machine or other hardwired logic reads and fetches the first page of the first block of flash memory, step 302. The flash memory chip itself may supply this first page after reset.

This first page in flash contains initial boot loader 60. Initial boot loader 60 is written into small RAM 70, step 304. The CPU is then activated, such as by bringing the CPU out of reset, and begins fetching and executing instructions from address 0 in the small RAM. The initial boot loader was written to these first addresses in the small RAM in step 304, so the initial boot loader is executed from the small RAM, step 306.

As the initial boot loader is executed by the CPU from the small RAM, the next page in the flash memory is read and this next page is written to a buffer area of the small RAM, step 310. The small RAM can be 2 or more pages in size, such as 1K bytes. The next page from flash is then copied from the buffer area of the small RAM to the DRAM, starting at address 0 in the DRAM, step 312.

Steps 310, 312 are repeated when there are more pages of extended boot sequence 62 to fetch from the flash memory, step 314. When all pages of extended boot sequence 62 have been copied, step 314, then extended boot sequence 62 is executed from the first address in the DRAM, step 316. The CPU may write a register in bus logic and registers 42 such as a RAM_BASE bit to cause the CPU to fetch from DRAM rather than the small RAM. Then the CPU may be reset to begin fetching from DRAM.

In FIG. 11B, as extended boot sequence 62 is being executed from DRAM, pages of complete boot sequence 64 are read from flash memory, step 320, and written to the buffer area of the small RAM. The page of the complete boot sequence is then copied from the buffer area of the small RAM to the next free page in DRAM, step 322.

Pages in the buffer area of the small RAM may be overwritten with new pages once the older pages have been copied to DRAM. A verification process may also be performed after each page is copied, or a checksum may be calculated and compared to a stored checksum.

When more pages of complete boot sequence 64 still remain to be fetched, step 324, then steps 320, 322 are repeated until all pages in complete boot sequence 64 have been copied to DRAM. Then the complete boot sequence can be executed from DRAM, such as by jumping from an instruction in the extended boot sequence to an instruction in the complete boot sequence, or by fetching sequentially across the boundary in DRAM between extended boot sequence 62 and complete boot sequence 64. Since both are in DRAM, a reset is not needed.

As complete boot sequence 64 is executed from DRAM, step 326, pages in flash memory continue to be read that contain OS image 66. These pages may be in several consecutive blocks of flash memory. Each page of OS image 66 is read from the flash memory and written to the buffer area of the small RAM, step 330, and then copied from the buffer area to the next available page in DRAM, step 332. Additional pages are fetched by repeating steps 330, 332, until all pages of OS image 66 have been copied to DRAM, step 334. Then execution transfers from complete boot sequence 64 to OS image 66, such as by a jump instruction being executed by complete boot sequence 64 that has a target in OS image 66, step 336. Application and user programs may then be loaded and executed by the OS.

The buffer area of the small RAM could be expanded to include the area in small RAM 70 that was occupied by initial boot loader 60 after initial boot loader 60 has finished execution. This can allow 2 or more pages to be transferred in each step rather than just one page. Also, the size of the buffer area may be large enough for several pages to be transferred together, possibly improving performance.

BOT Mode for Universal-Serial-Bus (USB)

According to another aspect of the invention, described more fully in the parent application, U.S. Ser. No. 11/466,759, an input/output interface circuit is activated so as to establish USB Bulk Only Transport (BOT) communications with the host computer via the interface link. There are four types of USB software communication data flow between a host computer and the USB interface circuit of the flash memory device (also referred to as a "USB device" below): control, interrupt, bulk, and isochronous. Control transfer is the data flow over the control pipe from the host computer to the USB device to provide configuration and control information to a USB device. Interrupt transfers are small-data, non-periodic, guaranteed-latency, device-initiated communication typically used to notify the host computer of service needed by the USB device. Movement of large blocks of data across the USB interface circuit that is not time critical relies on Bulk transfers. Isochronous transfers are used when working with isochronous data. Isochronous transfers provide periodic, continuous communication between the host computer and the USB device. There are two data transfer protocols generally supported by USB interface circuits: Control/Bulk/Interrupt (CBI) protocol and Bulk-Only Transfer (BOT) protocol. The mass storage class CBI transport specification is approved for use with full-speed floppy disk drives, but is not used in high-speed capable devices, or in devices other than floppy disk drives (according to USB specifications). In accordance with an embodiment of the present invention, a USB flash device transfers high-speed data between computers using only the Bulk-Only Transfer (BOT) protocol. BOT is a more efficient and faster transfer protocol than CBI protocol because BOT transport of command, data, status rely on Bulk endpoints in addition to default Control endpoints.

As with previous embodiments described above, the processing unit is selectively operable in a programming mode, where the processing unit causes the input/output interface circuit to receive the data file from the host computer, and to store the data file in the flash memory device through write commands issued from the host computer to the flash memory controller, a data retrieving mode, where the processing unit receives the data in the flash memory device through read command issued from the host computer to the flash memory controller and to access the data file stored in the flash memory device, and activates the input/output interface circuit to transmit the data file to the host computer, and a data resetting mode where the data file is erased from the flash memory device.

Advantages of the intelligent processing unit in accordance with the present invention include:

(1) providing high integration, which substantially reduces the overall space needed and reduces the complexity and the cost of manufacturing. (2) utilizing an intelligent algorithm to detect and access the different flash types, which broadens the sourcing and the supply of flash memory; (3) by storing the portion of software program along with data in flash memory which results in the cost of the controller being reduced; and (4) utilizing more advanced flash control logic which is implemented to raise the throughput for the flash memory access.

In accordance with another embodiment of the present invention, a system and method is provided for controlling flash memory in an electronic data flash card. The system and method provide a flash memory controller including a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains information regarding the flash memory configuration. The processor selectively utilizes the index to determine the sectors of the flash memory that are available for programming, reprogramming, or reading. The flash memory controller further comprises a recycling first-in-first-out (FIFO) that recycles blocks of obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the physical configuration of the flash memory. Consequently, speeds at which data is written to and read from the flash memory is significantly increased while the flash memory remains compatible with the USB standard and ASIC architecture.

The following terms are defined as indicated in accordance with the present invention. Block: A basic memory erase unit. Each block contains numerous sectors, e.g., 16, 32, 64, etc. If any sector encounters write error, the whole block is declared a bad block and all valid sectors within the block are relocated to another block. Sector: A sub-unit of a block. Each sector typically has two fields—a data field and a spare field. Obsolete sector: A sector that is programmed with data but the data has been subsequently updated. When the data is updated, the obsolete data remains in the obsolete sector and the updated data is written to new sectors, which become valid sectors. Non-valid blocks: Blocks that contain obsolete sectors. Valid sector: A sector that has been programmed with data and the data is current, i.e., not obsolete. Wear leveling: A method for evenly distributing the number times each block of flash memory is erased in order to prolong the life of the flash memory. Flash memory can be block erased only a limited number of times. For example, one million is a typical maximum number of erases for NAND flash memory. Spare blocks: Reserved space in flash memory. Spare blocks enable flash memory systems to prepare for bad blocks. Cluster: Multiple data sectors used as file access pointers by an operating system to improve memory performance. In small mass-storage memory operation, a cluster normally is a combination of two data sectors, which is a minimum file size unit. 1 k byte is a typical cluster size for small blocks of memory (i.e., 512 bytes per sector), and 4 k bytes is a cluster size for larger blocks of memory (i.e., 2,112 bytes per sector). FAT: File allocation table having file address-linked pointers. A cluster is the unit for a FAT. For example, FAT16 means that a cluster address can be 16 bits. Directory and subdirectory: File pointers as defined by an operating system. Master boot record (MBR): A fixed location to store a root directory pointer and associated boot file if bootable. This fixed location can be the last sector of the first block, or the last sector of the second block if first block is bad. Packet: A variable length format for a USB basic transaction unit. A normal transaction in the USB specification typically consists of three packets—a token packet, a data packet, and a handshake packet. A token packet has IN, OUT, and SETUP formats. A data packet size can be varying in size, e.g., 64 bytes in USB revision 1.1, and 512 bytes in USB revision 2.0. A handshake packet has ACK or NACK formats to inform host of the completion of a transaction. Frame: A bulk transaction that is used that has a high priority for occupying a frame if USB traffic is low. A bulk transaction can also wait for a later frame if USB traffic is high. Endpoint: Three endpoints include control, bulk-in, and bulk-out. The control endpoint is dedicated to system initial enumeration. The bulk-in endpoint is dedicated to host system read data pipe. The bulk-out endpoint is dedicated to a host system write data pipe. Command block wrapper (CBW): A packet contains a command block and associated information, such as Data Transfer Length (512 bytes for example from byte 8-11). A CBW always starts at the packet boundary, and ends as short packet with exactly 31 bytes transferred. All CBW transfers shall be ordered with LSB (byte 0) first. Command Status Wrapper (CSW): A CSW starts at packet boundary. Reduced block command (RBC) SCSI protocol: a 10 byte command descriptor.

According to the system and method disclosed herein, the present invention provides numerous benefits. For example, it shifts the management of the flash memory and related intelligence from the host system to the flash memory controller so that the host system interacts with the flash memory controller without the host system having information regarding the configuration of the flash memory. For example, the flash memory controller provides LBA-to-PBA translation, obsolete sector recycling, and wear leveling. Furthermore, the recycling operations are performed in the background. Furthermore, flash specific packet definitions and flags in the flash memory are eliminated. Furthermore, the flash memory controller provides multiple-block data access, dual channel processing, and multiple bank interleaving. Consequently, speeds at which data is written to and read from the flash memory is significantly increased while the flash memory remains compatible with the USB standard and ASIC architecture.

A system and method in accordance with the present invention for controlling flash memory are disclosed. The system and method comprise a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains intelligence regarding the flash memory configuration. The processor can utilize the index to determine the sectors of the flash memory that are available for programming, reprogramming, or reading. The flash memory controller further comprises a recycling first-in-first-out (FIFO) that recycles blocks having obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the configuration of the flash memory. Consequently, speeds at which data is written to and read from the flash memory is significantly increased while the flash memory remains compatible with the USB standard and ASIC architecture.

Figure 12A:
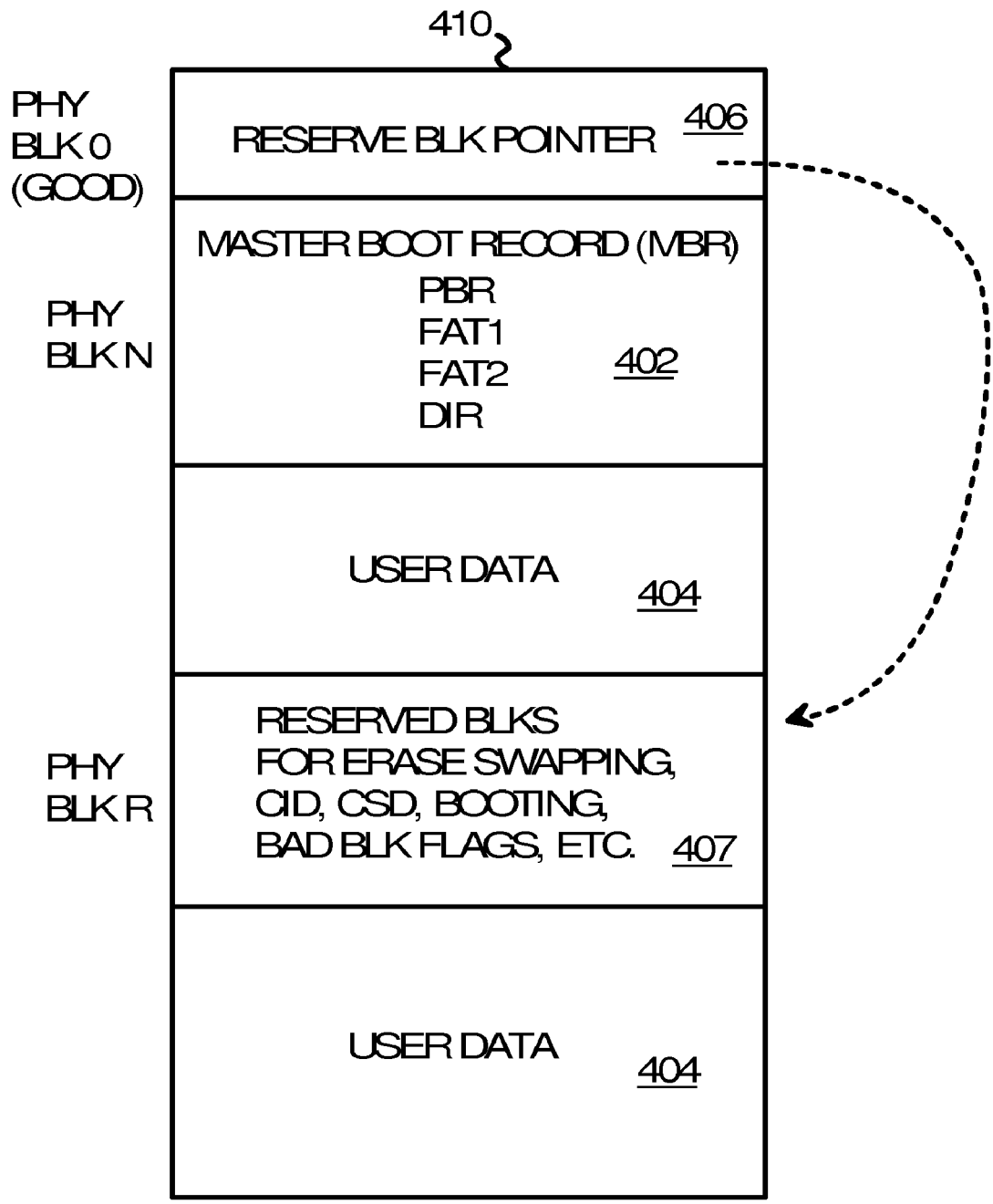
FIGS. 12A-B are diagrams of a flash memory structure.
Figure 12B:
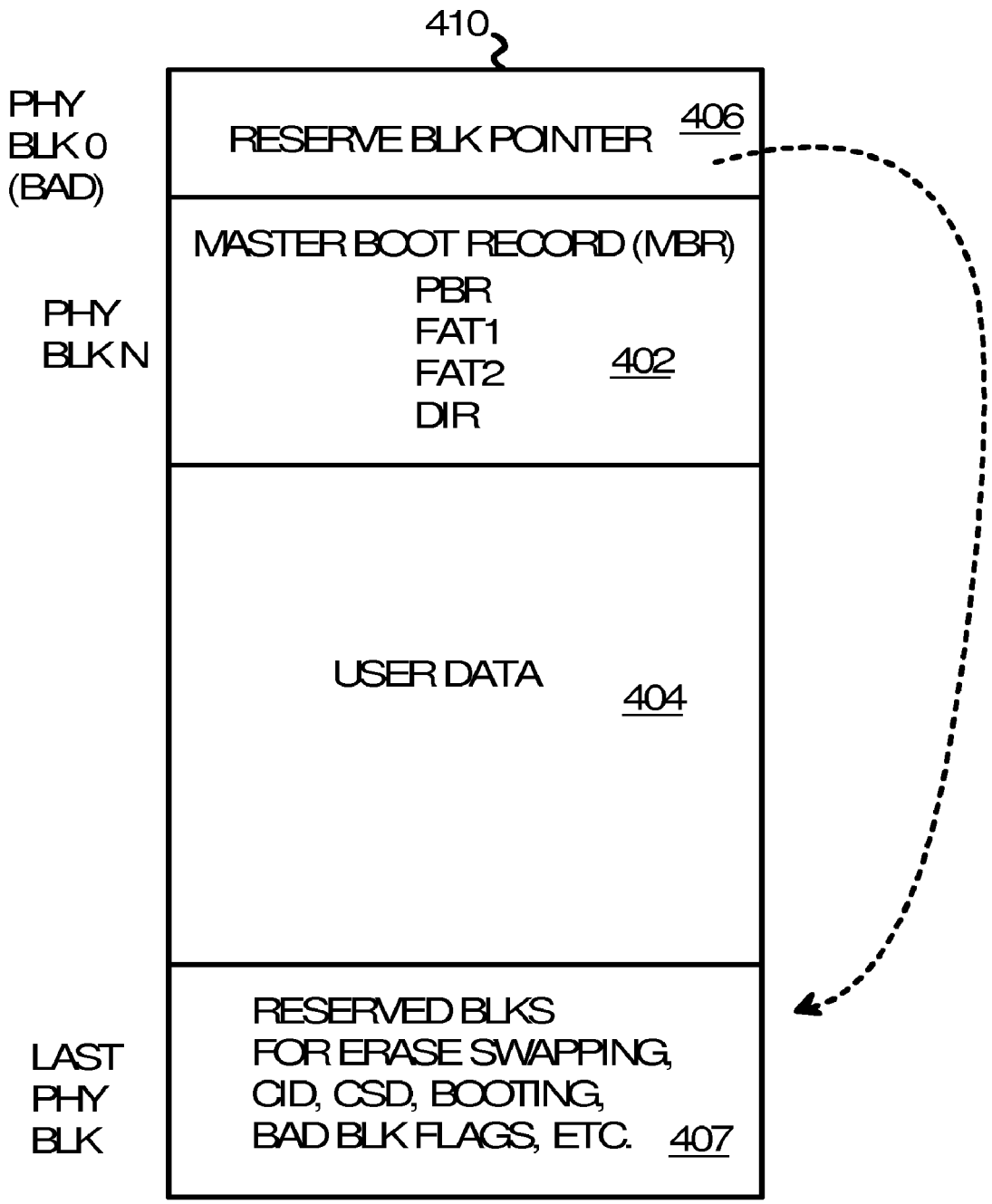

FIGS. 12A-B are diagrams of a flash memory structure. In FIG. 12A, reserve block pointer 406 points to physical block R in flash memory 410 as the reserved block that is used for erase swapping, bad block mapping, booting, and other system functions. The master boot record MBR 402 contains file directories and file allocation tables (FAT). User data 404 contains the data stored for users.

It is possible that the first physical block in flash memory is a bad block. In FIG. 12B, physical block 0 is a bad block. Reserve block pointer 406 cannot be read. Instead, a software program such as a Mass Production Tool (MPT) reads the last physical block for reserved blocks 407. The MPT can configure the SCFD as a FAT32 file system with a Master Boor Record (MBR) during production before shipping to the end user. Other pre-defined locations could also be used.

Reserved area 407 in the final block of the flash memory device is used for storing final block data of information associated with the flash memory operations (e.g., the boot code and control code). Such information includes reserved blocks, card non-volatile (NV) registers, a library image file, boot code, control code, a bad block map, and operation registers. Reserved area 407 may have one or more spare areas so that a back-up copy of the old final block data is saved. Additional spare areas when available are for back-up copies of older final block data.

Reserved area 407 are used for erase swapping. After old final block data is erased, new data is copied back. Wear leveling problems are not at issue in reserved area 407, since updates to either codes or registers occur very infrequently compared to normal data transfers.

The card non-volatile (NV) registers contain necessary parameters, such as card identification (CID) data that the host uses for transfer protocols. The library image file includes a maker byte, a device byte, and other information read from a flash command.

With regard to the boot code and the control code, at least two copies of each are stored in the flash memory device. This provides a back-up copy during updates. During an update, only one of the two copies is updated to reflect the latest changes. The other copy is saved as a back-up copy without any changes, in case any unknown failures occur during the update. Also, these two copies are toggled such that during a subsequent update, the original back-up copy is updated with the latest code, and the copy of the first update becomes the new back-up copy. While two copies are stored in this specific embodiment, more copies can exist if the memory size is sufficient. Additional blocks can be reserved to accept larger sizes of boot and control code.

The bad block map records the bad blocks. Bad blocks in the flash memory may manifest at various times, including when the block was first created, and can occur in later stages while being erased or programmed. In a specific embodiment, each block is represented by one bad-block bit, where a logical one ("1") represents a good block and a logical zero ("0") represents a bad block. The bad block mapping table also indicates the remaining life of the flash memory based on the ratio of good blocks to bad blocks. All flash memory brands have specification-defined position for the bad-block bit, which is known after reading the maker code. Such positions are typically located several bytes after the beginning position of a spare data field. Reserved area 407 would not include any bad block(s) detected during a block scan.

The operation registers contain checksum data and address pointers. The address pointers are shared with DMA flash address starting registers. Also stored in this sector is basic information that the flash card controller requires, such as pointers to the copies of the boot code and control code, the start address, and the user storage capacity of the flash memory system.

Figure 13:
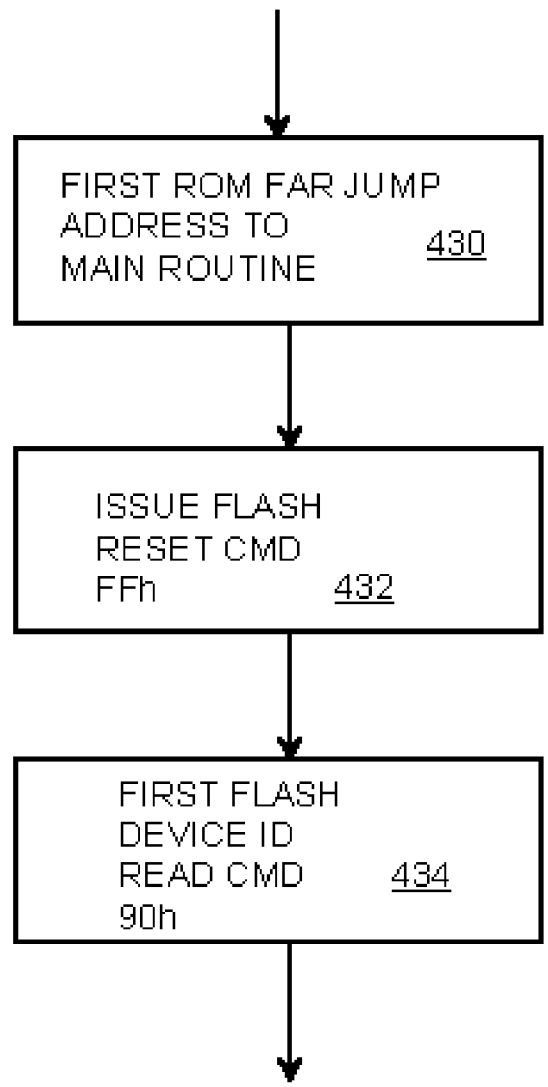
FIG. 13 shows a sequence of steps during flash reset.

FIG. 13 shows a sequence of steps during flash reset. When the first far jump instruction to the main flash control routine is executed, step 430, then a flash reset command is issued by the embedded controller of FIG. 1D, step 432. Then the first flash device ID read command, 90h, is issued, step 434. The characteristics of flash die/chip, such as the manufacturer (Samsung, Toshiba, etc.), its capacity, organization into banks, page size, etc. are read out by step 434.

The user storage capacity of the flash memory device is calculated from a flash memory chip specification volume known from reading organization bytes after a "90h command" ID is read. The user storage capacity is the flash memory chip specification volume minus the reserved blocks and the bad blocks.

Figure 14:
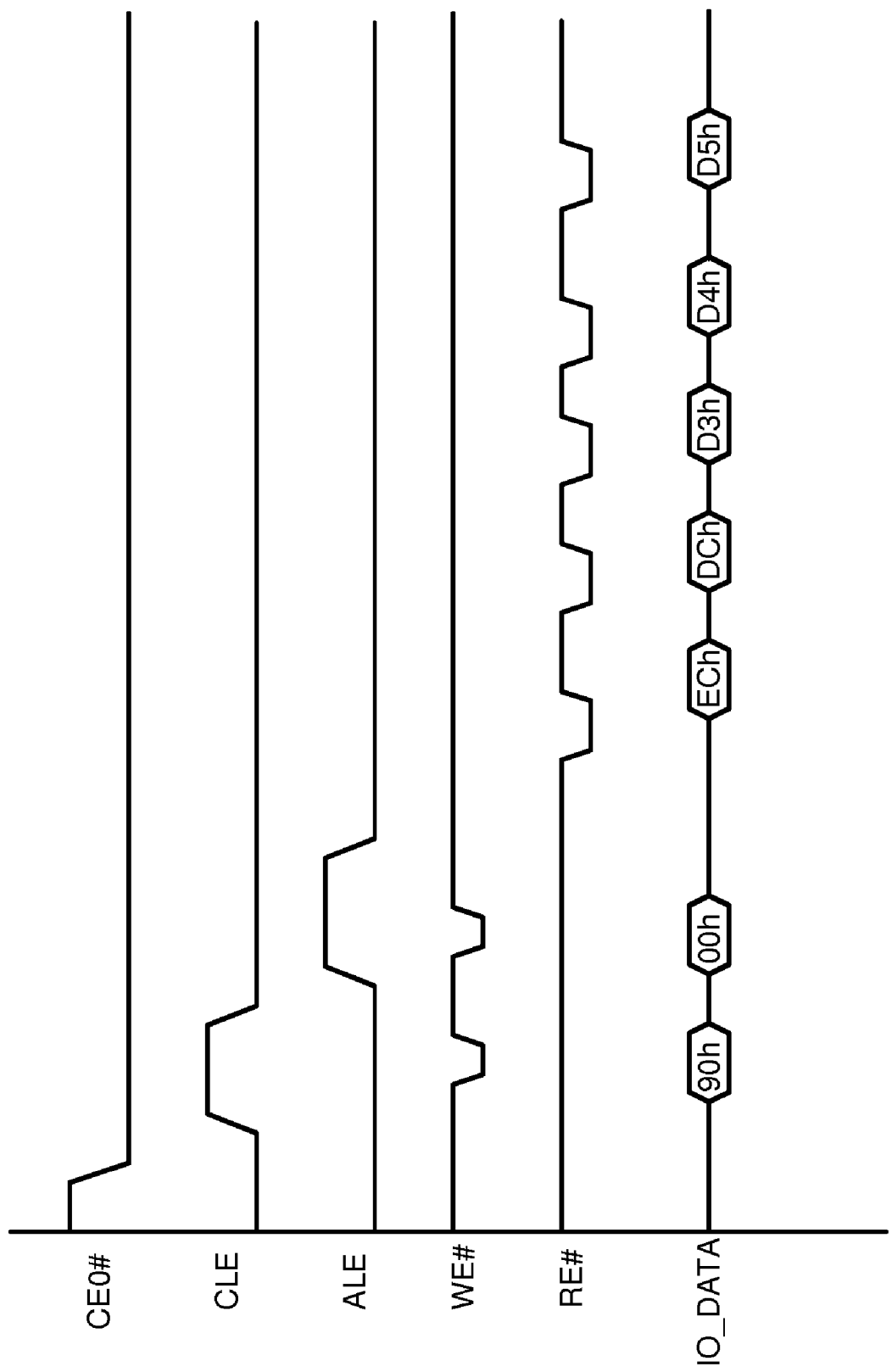
FIG. 14 is a timing diagram of detecting a type of flash memory.

FIG. 14 is a timing diagram of detecting a type or configuration of flash memory. The default ID is read from the flash device. The host writes command 90h to the flash device at address 00h. Then the device reads out the device ID—first the manufacturer code is read, followed by 4 cycles of the device code.

Alternate Embodiments

Several other embodiments are contemplated by the inventors. For example different numbers and arrangements of flash, RAM, and MMC cards or MMC hosts can connect to the controller. Rather than use MMC buses, other buses may be used such as a Universal Flash Storage (UFS) interface, Memory Stick, PCI Express bus, Compact Flash (CF), IDE bus, Serial ATA (SATA) bus, etc. Additional pins can be added or substituted for the MMC data pins. A multi-bus-protocol chip could have an additional personality pin to select which bus interface to use, or could have programmable registers. Rather than have a MMC microcontroller, a Memory Stick microcontroller could be substituted, for use with a memory-stick interface, etc.

Rather than write extended boot sequence 62 to address 0 in the DRAM, it can be written to another address in DRAM when the CPU can be configured to execute from an address other than address 0 Likewise, the first address fetched and executed in small RAM 70 may not be address 0.

While a page size of 512 bytes has been described, other pages sizes could be substituted, such as 1K, 2K, 4K, etc. Flash blocks may have 4 pages, 8 pages, 64 pages, or some other number, depending on the physical flash chips and arrangement used.

While the invention has been described as not requiring ROM for booting, some ROM may still be present on the chip. For example, a revision number may be included in a small ROM. Hard-wired gates that are tied to power or ground may also function as a read-only memory. While such ROM may be present, ROM is not required for storing boot code or booting instructions. A few bytes or more of ROM may be thus present for other purposes.

Mode logic could sense the state of a pin only at power-on rather than sense the state of a dedicated pin. A certain combination or sequence of states of pins could be used to initiate a mode change, or an internal register such as a configuration register could set the mode.

The flash memory system can have one or more flash memory devices depending on the requirements of the specific application. If more than one flash memory device is used, the flash memory devices are preferably the same make and type. However, they need not be the same make or type.

The microcontroller and MMC components such as the bus interface, DMA, flash-memory controller, transaction manager, and other controllers and functions can be implemented in a variety of ways. Functions can be programmed and executed by the CPU or other processor, or can be implemented in dedicated hardware, firmware, or in some combination. Many partitioning of the functions can be substituted.

Data and commands may be routed in a variety of ways, such as through data-port registers, FIFO or other buffers, the CPU's registers and buffers, DMA registers and buffers, and flash registers and buffers. Some buffers may be bypassed or eliminated while others are used or present. Virtual or logical buffers rather than physical ones may also be used. Data may be formatted in a wide variety of ways.

The host can transfer standard MMC commands and data transactions to the MMC transceiver during a transaction. Other transaction types or variations of these types can be defined for special purposes. These transactions may include a flash-controller-request, a flash-controller-reply, a boot-loader-request, a boot-loader-reply, a control-program-request, a control-program-reply, a flash-memory-request, and a flash-memory-reply. The flash-memory request/reply may further include the following request/reply pairs: flash ID, read, write, erase, copy-back, reset, page-write, cache-write and read-status.

The host may be a personal computer (PC), a portable computing device, a digital camera, a phone, a personal digital assistant (PDA), or other electronic device. The small RAM could be internal to MMC flash microcontroller 730 or could be external. ROM 44 could be replaced by small RAM 70, while RAM 34 could be replaced by the DRAM. Small RAM 70 could be part of a RAM array that includes a cache or a FIFO 94. The partition of RAM among various functions could change over time.

Wider or narrower data buses and flash-memory blocks could be substituted, such as 4, 5, 8, 16, 32, 64, 128, 256-bit, or some other width data channels. Alternate bus architectures with nested or segmented buses could be used internal or external to the microcontroller. Two or more internal and flash buses can be used in the MMC flash microcontroller to increase throughput. More complex switch fabrics can be substituted for the internal buses.

The flash mass storage chips or blocks can be constructed from any flash technology including multi-level-logic (MLC) memory cells. Data striping could be used with the flash mass storage blocks in a variety of ways, as can parity and error-correction code (ECC). Data re-ordering can be adjusted depending on the data arrangement used to prevent re-ordering for overlapping memory locations. A MMC switch could be integrated with other components or could be a stand-alone chip. The MMC switch could also be integrated with the MMC single-chip flash device. While a single-chip device has been described, separate packaged chips or die may be stacked together while sharing I/O pins, or modules may be used.

The patent application, U.S. Ser. No. 10/888,282, describes a molded casing formed over a printed circuit board assembly (PCBA) in which the PCBA is positioned and secured in a molding assembly such that the mold cavity extends at least over the side edges of the PCBA substrate such that a portion of the lower surface is exposed along the peripheral edges of the substrate, and the PCBA substrate is securely held against the lower surface of the molding assembly to prevent molding material from forming on the bottom surface of the substrate. The memory cards produced by this method exhibit increased card capacity and functionality due to the increased available substrate area for mounting integrated circuits and other components. In addition, the molded casing provides a physically rigid memory card by filling gaps and spaces that are otherwise not filled when separate covers are used. In addition, the molded casing enables the use of a wide range of memory devices by allowing the casing material formed over the memory device to be made extremely thin, or omitted entirely.

According to an embodiment of the present invention, a single-cavity molding assembly is utilized to form memory cards one at a time. PCBAs are formed by mounting several IC components on an upper surface of a substrate that has several contact pads exposed its lower surface. In alternative embodiments, the memory device is arranged with its long axis extending across the substrate or along the long axis of the substrate. The PCBA is then positioned inside of mold assembly cavity such that a gap is provided between the peripheral edges of the substrate and the inside walls of the mold assembly (i.e., such that a portion of the mold assembly surface on which the PCBA is placed is exposed around the entire perimeter of the PCBA substrate). Positioning of the PCBAs is facilitated using one or more of a positioning block, retractable positioning rods, L-shaped corner blocks, and a pick-and-place machine. In alternative embodiments, one or more release films are interposed between the mold assembly and the PCBA. The substrate is then secured to the lower surface of the mold assembly using one or more of a retractable rod that extends downward onto the substrate at a point opposite to the contact pads, and by applying vacuum suction to the underside of the substrate. During subsequent injection of the molten molding material (e.g., plastic), the retractable rod is retracted to allow the cavity space taken up by the rod to be filled with molding material. After cooling, the PCBA, now having a molded casing formed over the IC components and extends from each edge of the substrate, is removed from the molding assembly and subjected to optional testing and labeling.

In this embodiment, during the molding process, a rod extends from an upper portion of the mold assembly and pushes the substrate against the lower surface. A vacuum is then applied to hold the substrate against the lower surface of the mold, and the rod is subsequently withdrawn from the mold cavity during injection of the molten molding material. A single cavity mold assembly provides molding material extends over front and back edges of the memory card.

The parent application, U.S. Ser. No. 12/175,753, describes a Secure Digital (SD) flash device including a PCBA having passive components mounted on a PCB using surface mount technology (SMT) techniques, and active components (e.g., controller and flash memory) mounted using chip-on-board (COB) techniques. The components are mounted only on one side of the PCB, and then a molded plastic casing is formed over both sides of the PCB such that the components are encased in the plastic, and a thin plastic layer is formed over the PCB surface opposite to the components. The molded plastic casing is formed to include openings that expose metal contacts provided on the PCB, and ribs that separate the openings. In one embodiment the metal contacts are formed on the same side as the thin plastic layer, and in an alternate embodiment the metal contacts are formed on a block that is mounted on the PCB during the SMT process.

Different numbers and arrangements of MMC flash storage blocks can connect to the MMC switch. Rather than use MMC buses, other buses may be used such as Memory Stick, PCI Express bus, IDE bus, Serial ATA (SATA) bus, etc. Additional pins can be added or substituted for the MMC data pins. A multi-bus-protocol chip could have an additional personality pin to select which bus interface to use, or could have programmable registers. Rather than have a MMC microcontroller, a Memory Stick microcontroller could be substituted, for use with a memory-stick interface.

The boot loader and control program could be larger than the first page of the flash memory or could be less than the size of the first page. The entire first page or just a portion of the first page could be transferred. Different page sizes could be substituted. One of the flash mass storage blocks 722, 723, 724 could be designated to respond during the first-page auto-read sequence and not the others. Backup copies could be kept in the others of flash mass storage blocks 722, 723, 724. More than one backup copy could be kept. The control program could call still other programs or routines. More complex memory management could be added.

The CPU could be taken out of reset but kept in a hold state or otherwise suspended from execution while the boot loader and control program are being transferred from the flash mass storage block. Several re-tries of reading or writing the boot loader or control program could be attempted.

The flash mass storage blocks can be constructed from any flash technology including NAND, NOR, AND, or multi-level-logic memory cells. Data striping could be used with the flash mass storage blocks 722, 723, 724 in a variety of ways, as can parity and error-correction code (ECC). Data re-ordering can be adjusted depending on the data arrangement used to prevent re-ordering for overlapping memory locations. An MMC switch could be integrated with other components or could be a stand-alone chip. The MMC switch could also be integrated with MMC single-chip flash devices 740. While a single-chip device has been described, separate packaged chips or die may be stacked together while sharing I/O pins, or modules may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A single-chip flash device for communicating with a host system, the single-chip flash device comprising: a flash memory device including a plurality of non-volatile memory cells for storing a data file, the non-volatile memory cells being arranged in at least one of a plurality of memory blocks, a plurality of pages, and a plurality of sectors; an input/output interface circuit for establishing communication with the host system, wherein the input/output interface circuit includes a parallel or serial interface circuit including means for transmitting the data file using an embedded storage protocol; a flash memory controller, electrically connected to the flash memory device and to the input/output interface circuit, wherein the flash memory controller comprises a processor, a main memory coupled to the processor for storing instructions for execution by the processor, and an interface for switching to one of a plurality of internal buses; wherein the flash memory controller further comprises a volatile main memory circuit, and means for transferring the at least one of a boot code data and a control code data from the flash memory device to the volatile main memory circuit in accordance with instructions read from a memory; wherein the flash memory controller includes update means for updating only a first copy of the control code data in the flash memory device, and means for utilizing a second copy of the control code data as an identical back-up copy; and wherein the flash memory controller further comprises means for transferring the boot code data to a main memory before transferring the control code data to the main memory, and means for freeing up the main memory space occupied by the boot code data after the control code data is transferred to the main memory.

2. The single-chip flash device of claim 1 wherein the flash memory device includes a first flash memory device and a second flash memory device, and wherein the flash memory controller includes means for supporting at least one of dual-channel parallel access and interleave access to the first flash memory device and the second flash memory device.

3. The single-chip flash device of claim 1 wherein the input/output interface circuit, the flash memory controller, and the flash memory device are integrated together in a single multi-chip package (MCP) or in a single integrated circuit (IC) chip.

4. The single-chip flash device of claim 3 wherein the single-chip flash device is in a package having forty or fewer external pins.

5. The single-chip flash device of claim 3 further comprising:
a molded plastic case surrounding the input/output interface circuit, the flash memory controller, and the flash memory device, the molded plastic case having openings exposing contact pads coupled to the input/output interface circuit;
a printed circuit board assembly (PCBA) including a substrate having a plurality of integrated circuit components mounted on an upper surface thereof and a plurality of contact pads exposed on a bottom surface thereof, wherein the substrate has a continuous peripheral edge extending around an entire perimeter thereof and excludes any structure that extends from the continuous peripheral edge away from the substrate;
wherein the PCBA is positioned inside of a cavity defined by a mold assembly, the mold assembly having a lower mold portion having a lower surface for receiving the PCBA, and an upper mold portion mounted over the PCBA, wherein the cavity extends over the continuous peripheral edge of the substrate such that a portion of the lower surface is exposed around the entire perimeter of the substrate;
wherein the substrate is secured to the lower surface of the mold assembly such that the bottom surface of the substrate is held against the lower surface of the lower mold portion; and
injecting molten material forced into the cavity such that the molten material forms the molded plastic case over the IC components, whereby molten material flows over the continuous peripheral edge of the substrate and contacts the exposed portion of the lower surface of the lower mold portion, thereby forming casing portions that cover the continuous peripheral edge of the substrate and extend over the entire perimeter of the substrate, wherein the substrate is secured during injection such that molten material is prevented from forming on the bottom surface of the substrate;
wherein the plurality of integrated circuit components comprises the input/output interface circuit, the flash memory controller, and the flash memory device.

6. The single-chip flash device of claim 1 wherein the flash memory controller includes means for storing both the boot code data and the control code data in the flash memory device.

7. The single-chip flash device of claim 1 wherein the flash memory controller includes means for storing first and second copies of the control code data in the flash memory device.

8. The single-chip flash device of claim 1 wherein the means for transferring the at least one of the boot code data and the control code data from the flash memory device to the volatile main memory circuit comprises utilizing direct memory access (DMA) to transfer the at least one of the boot code and the control code from the flash memory device to a main memory.

9. A single-chip flash device comprising: a clocked-data interface to a host bus that connects to a host; a bus transceiver for detecting and processing commands sent over the host bus; a buffer for storing data sent over the host bus; an internal bus coupled to the buffer; a random-access memory (RAM) for storing instructions for execution, the RAM on the internal bus; a central processing unit, on the internal bus, the CPU accessing and executing instructions in the RAM; a flash-memory controller, on the internal bus, for generating flash-control signals and for buffering commands, addresses, and data to a flash bus; flash mass storage blocks coupled to the flash-memory controller by the flash bus, and controlled by the flash-control signals; a direct-memory access (DMA) engine, on the internal bus, for transferring data over the internal bus; and a flash programming engine, activated by a reset, for initially programming the DMA engine to transfer an initial program of instructions from the flash mass storage blocks to the RAM before the CPU begins execution of instructions after the reset; whereby the initial program of instructions is transferred from the flash mass storage blocks to the RAM before execution by the CPU begins; wherein the transfer means further comprises: control register means for indicating a first mode and a second mode; wherein the CPU fetches instructions from the RAM during the first mode; wherein the CPU fetches instructions from the second RAM during the second mode; and toggle means, activated by execution of an initial boot loader, for changing the control register means from the first mode to the second mode before the initial program of instructions is executed by the CPU; and wherein the flash mass storage blocks are initially readable after a reset before receiving a command and a physical address over the flash bus; wherein the flash mass storage blocks send data in a first page over the flash bus after the reset and before receiving a command and a physical address over the flash bus.

10. The single-chip flash device of claim 9 further comprising:
a second RAM for storing instructions for execution, the second RAM on the internal bus;
transfer means for transferring execution by the CPU from the second RAM to the RAM.

11. The single-chip flash device of claim 9 wherein the initial program of instructions is a boot-loader program that transfers a control program of instructors from the flash mass storage blocks to the RAM when the CPU begins execution of the boot-loader program after reset.

12. The single-chip flash device of claim 11 wherein data in the flash mass storage blocks are accessible by the flash-memory controller sending a request sequence over the flash bus, the request sequence including a command followed by a physical address;
wherein the data in the flash mass storage blocks is block-addressable while the RAM is randomly-addressable by the CPU.

13. The single-chip flash device of claim 9 wherein the host bus is a Multi-Media Card (MMC) bus having parallel data lines and a clock, or wherein the host bus is a eMMC bus, a Universal Flash Storage (UFS) bus, Memory-Stick bus, a PCI Express bus, an IDE bus, or a Serial ATA (SATA) bus.

14. A multi-interface microcontroller comprising: input/output interface circuit means for establishing communication with a host computer, wherein the input/output interface circuit means includes a Multimedia Card (MMC) interface circuit or wherein the input/output interface includes a eMMC bus, a Universal Flash Storage (UFS) bus, a Memory-Stick bus, a PCI Express bus, an IDE bus, or a Serial ATA (SATA) bus; flash bus means for connecting to a flash memory, the flash bus means carrying address, data, and commands to the flash memory; wherein the flash memory stores an initial boot loader, an extended boot sequence, and a complete boot sequence in a non-volatile memory; first volatile memory means for storing first instructions for execution; second memory interface means for interfacing to a second volatile memory means for storing second instructions for execution; processor means, coupled to the input/output interface circuit means, for fetching and executing the first instructions in the first volatile memory means during a first mode and fetching and executing the second instructions from the second volatile memory means during a second mode; flash-memory controller means for generating flash-control signals and for buffering commands, addresses, and data to the flash bus means; hardwired initializer means, activated by a reset signal, for activating the flash-memory controller means to read the initial boot loader from the flash memory, and for writing the initial boot loader as the first instructions to the first volatile memory means; initial boot loader execution means for activating the processor means to fetch and execute the first instructions from the first volatile memory means, the initial boot loader execution means for activating the flash-memory controller means to read the extended boot sequence from the flash memory, for writing the extended boot sequence as the second instructions to the second volatile memory means; and extended boot sequence execution means for activating the processor means to fetch and execute the second instructions from the second volatile memory means, the extended boot sequence execution means for activating the flash-memory controller means to read the complete boot sequence from the flash memory, and for writing the complete boot sequence as additional second instructions to the second volatile memory means; wherein the transfer means further comprises: control register means for indicating a first mode and a second mode; wherein the processor means fetches instructions from the first volatile memory means during the first mode; wherein the processor means fetches instructions from the second volatile memory means during the second mode; and toggle means, activated by the initial boot loader execution means, for changing the control register means from the first mode to the second mode before the extended boot sequence execution means is activated.

15. The multi-interface microcontroller of claim 14 further comprising:
  transfer means for transferring execution by the processor means from the first volatile memory means to the second volatile memory means.

16. The multi-interface microcontroller of claim 14 further comprising: multiplexer means, coupled to the first volatile memory means and to the second volatile memory means, and responsive to the control register means, for sending the first instructions from the first volatile memory means to the processor means and for disabling transfer of the second instructions to the processor means when the control register means indicates the first mode, and sending the second instructions from the second volatile memory means to the processor means and for disabling transfer of the first instructions to the processor means when the control register means indicates the second mode.

* * * * *